US006850234B2

(12) United States Patent
Zviaguina et al.

(10) Patent No.: US 6,850,234 B2
(45) Date of Patent: Feb. 1, 2005

(54) METHOD AND SYSTEM FOR DETERMINING VISIBLE PARTS OF TRANSPARENT AND NONTRANSPARENT SURFACES OF THERE-DIMENSIONAL OBJECTS

(75) Inventors: Natalia Zviaguina, Netanya (IL); Makarov Igor, Netanya (IL)

(73) Assignee: 3rd Algorithm Limited Partnership, Boston, MA (US)

( * ) Notice: Subject to any disclaimer, the term of this patent is extended or adjusted under 35 U.S.C. 154(b) by 35 days.

(21) Appl. No.: 09/826,451

(22) Filed: Apr. 4, 2001

(65) Prior Publication Data

US 2002/0118188 A1 Aug. 29, 2002

(51) Int. Cl.[7] ............................................. G06T 15/40
(52) U.S. Cl. ....................................................... 345/421
(58) Field of Search ................................. 345/421, 426

(56) References Cited

U.S. PATENT DOCUMENTS 3,602,702 A * 8/1971 Warnock .................... 345/421

* cited by examiner

Primary Examiner—Mark Zimmerman
Assistant Examiner—Lance W. Sealey
(74) Attorney, Agent, or Firm—Goodwin Procter LLP

(57) ABSTRACT

There is provided a system, method and article of manufacture for determining the visibility of surfaces and/or parts of surfaces of three-dimensional objects, which are projected on a view plane from data defining these surfaces, comprising: a) deriving data indicative of boundaries of projections of the surfaces on the view plane; b) determining (preferably, by recursion) a finite number of subdivisions of the view plane thereby providing perimeters of each of the subdivisions; c) determining points of intersection of the perimeter of one of the subdivisions with the boundaries of the surfaces projected on the view plane; d) determining the distribution of surfaces visible along the perimeter of the of one of the subdivisions by utilizing the points of intersection; and e) determining if the one subdivision is "simple enough" of "terminal" from at least the distribution of surfaces visible along the perimeter of the one subdivision. In a preferred embodiment of the present solution, the visibility of surfaces and/or parts of surfaces of three-dimensional objects projected on a view plane are determined using one or more "minimal rectangles or subdivisions" as defined further herein.

30 Claims, 34 Drawing Sheets

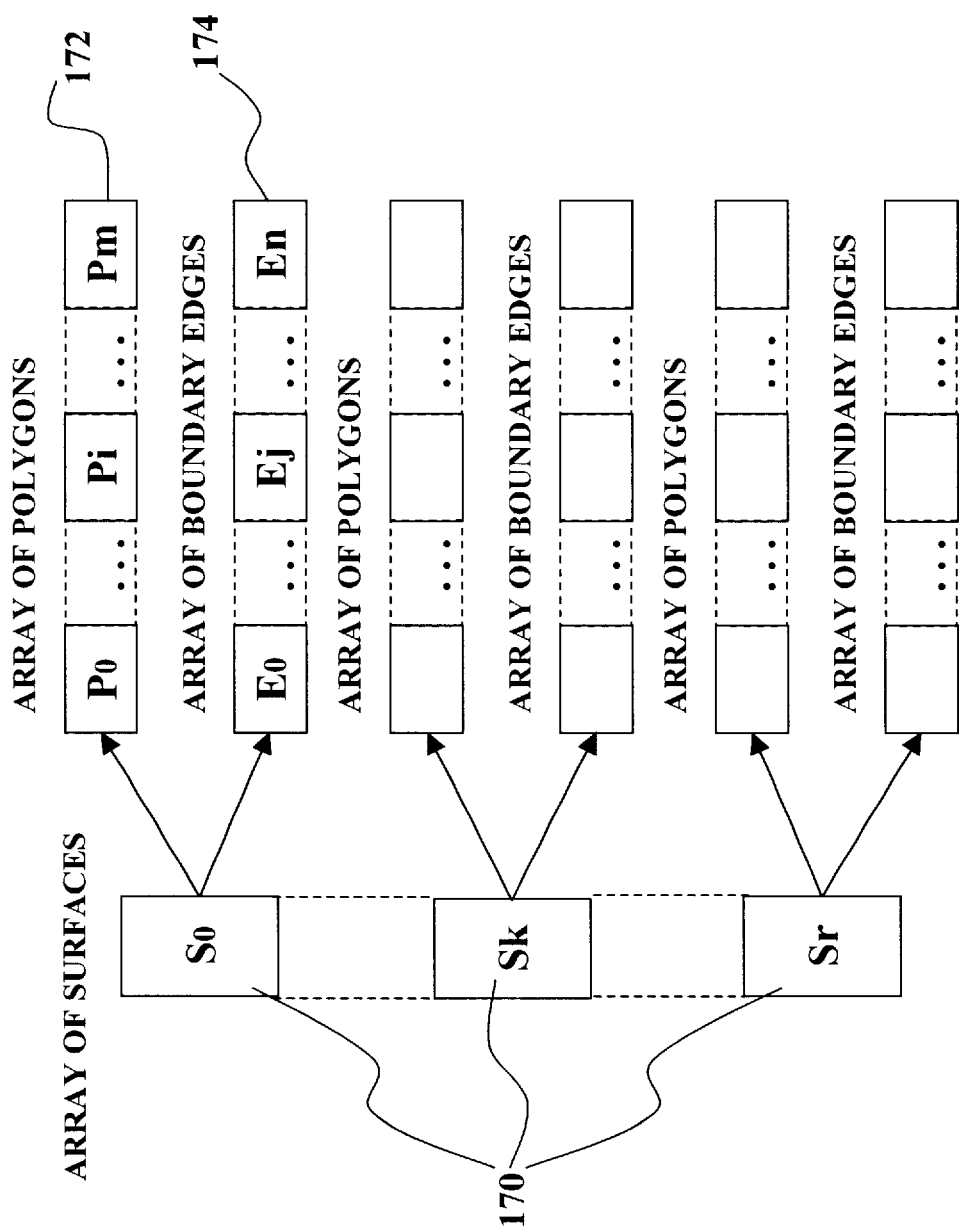

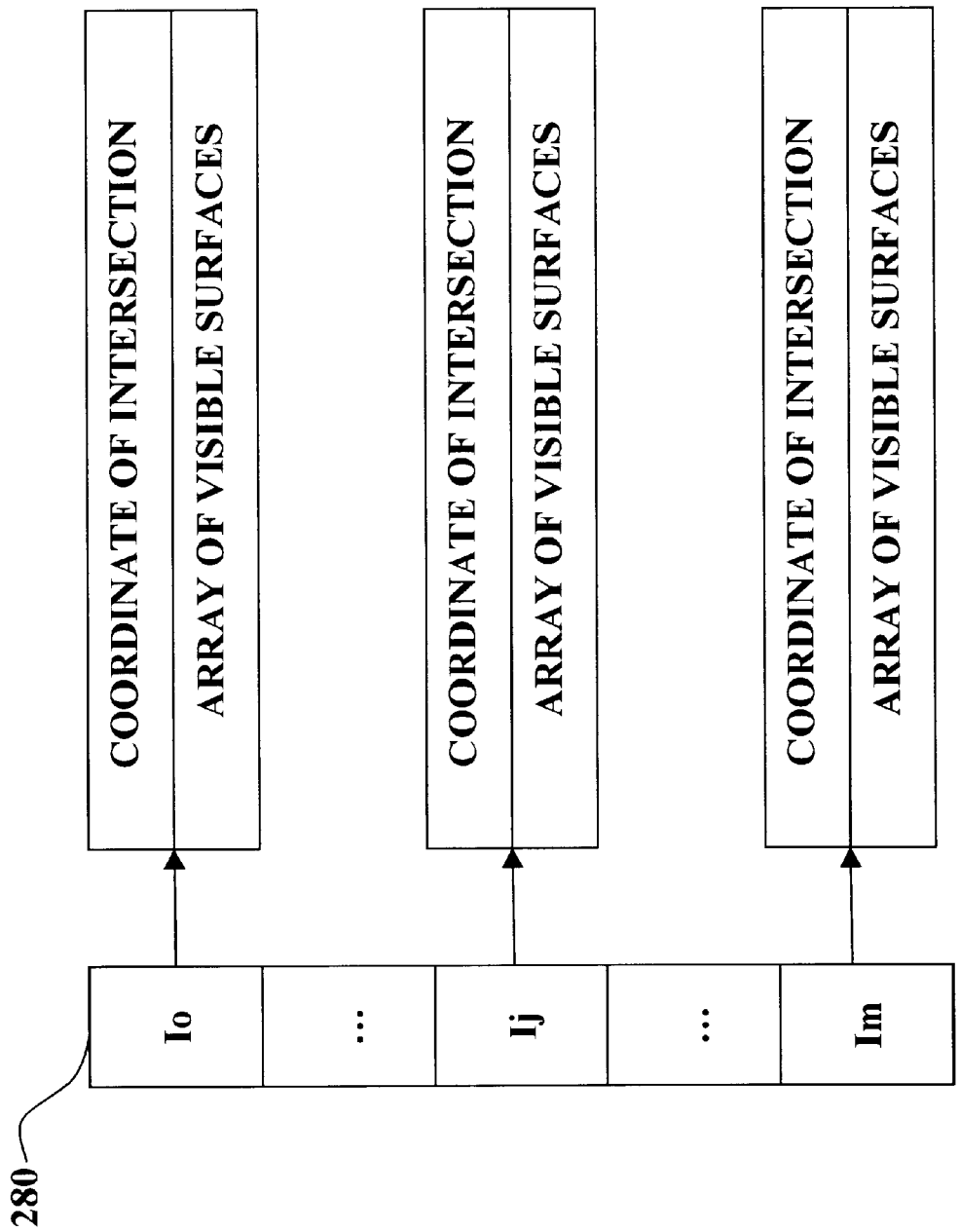

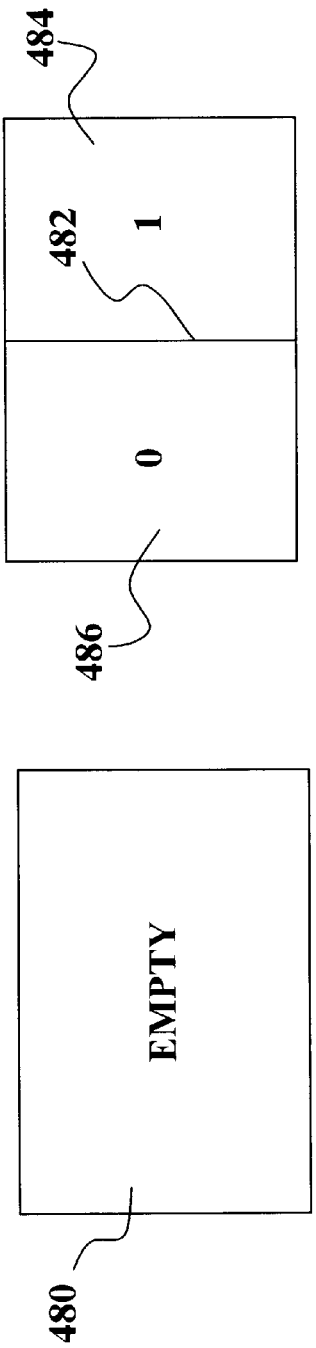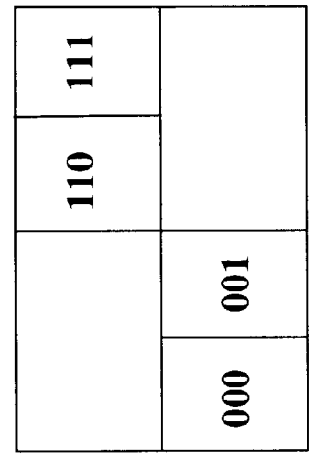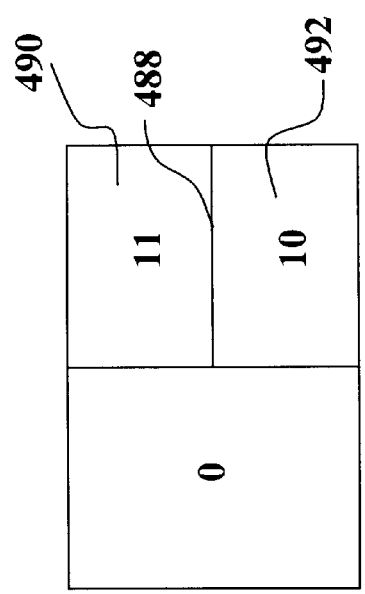
FIGURE 30A
FIGURE 30B
FIGURE 30C
FIGURE 30D

| NAME | INDEX | |
|---|---|---|
| empty | | 0 |
| 0 | +1 | 1 |
| 1 | +7 | 8 |
| 10 | +1 | 9 |
| 11 | +3 | 12 |
| 110 | +1 | 13 |

FIGURE 31

METHOD AND SYSTEM FOR DETERMINING VISIBLE PARTS OF TRANSPARENT AND NONTRANSPARENT SURFACES OF THERE-DIMENSIONAL OBJECTS

CROSS REFERENCE OF RELATED APPLICATION(S)/CLAIM OF PRIORITY

This application claims the benefit of co-pending Israeli Patent Application Serial No. 135465, filed Apr. 4, 2000, and entitled "Method and System for Determining Visible Parts of Transparent and Nontransparent Surfaces of Three-Dimensional Objects," the entire disclosure of which is incorporated by reference as if set forth at length herein.

Moreover, this application relates to co-pending Israeli Patent Application Serial No. 136430, filed May 29, 2000, and entitled "Ray-Tracing Method And System For Determining Visible Parts Of Surfaces Of Three-Dimensional Objects And Their Parameters Of Shading Accounting For Light And Shadow Volumes," the entire disclosure of which is also incorporated by reference as if set forth at length herein.

STATEMENT REGARDING FEDERALLY SPONSORED RESEARCH OR DEVELOPMENT

Not applicable.

REFERENCE OF AN APPENDIX

Not applicable.

BACKGROUND

1. Field of the Invention

The present invention relates generally to computer graphics and more particularly, to an improved process, apparatus, and article of manufacture for visible surface determination.

2. Description of Related Art

One or more three-dimensional object(s), together with their relative positions and orientations in three-dimensional coordinate space constitutes a three-dimensional scene. Generally, a three-dimensional object can be defined by a number of surfaces. A three-dimensional graphics renderer is a device, which translates a description of a three-dimensional scene containing a set of three-dimensional objects, into a two-dimensional image for display on display device such as a computer screen or other two-dimensional display medium. The graphics renderer can be implemented in dedicated hardware, software running on general purpose CPU, or a combination thereof.

As shown by the exemplary graphics rendering pipeline in FIG. 1A, rendering is a multi-step process. Bearing in mind that the particular order described below is not limiting in any sense, one way of ordering the steps follows:

1. Define a three-dimensional scene having three-dimensional objects by local or generalized coordinates;
2. Perform several transformations of local coordinates to world coordinates to eye or view coordinates;
3. Perform a perspective or parallel projection;
4. Perform back-face culling;
5. Determine visible surfaces;
6. Rasterize and write to a frame buffer; and
7. Display or store the generated image of the three-dimensional scene.

Every two-dimensional projection of a three-dimensional scene is generated assuming a particular location of an observer. A two-dimensional scene is then created from the observer's frame of reference, generally employing a view plane. The forgoing process is simplified if, for example, a coordinate system is adopted in which the observer is located at the origin, looking down the z-axis in the positive z direction. This type of coordinate system is called an eye or view coordinate system. Three-dimensional scenes are frequently described in generalized or local coordinates, which may have as their origin a location other than that of the observer. Thus, all objects intended for display in a two-dimensional system created from the observer's frame of reference must have their local or generalized coordinates expressed in eye coordinates. Generalized coordinates can be mapped to eye coordinates through conventional transformation techniques.

Reference is now made to FIG. 1, which is an illustration of a view volume 10, defined by a frustum (i.e., a truncated pyramid) and including a front and back clipping planes and a view plane. A view volume bounds a region in coordinate space that will be clipped and projected onto a view plane. While a view volume may have infinite extent, in practice, a view volume is delimited by using a front clipping plane abcd (12) and the back clipping plane a1b1c1d1 (14). The projection of a three-dimensional object is defined by straight projection rays 16, emanating from the origin of an eye coordinate system, passing through each point of the object and intersecting a view plane a2b2c2d2 (18) to form the projection. For an arbitrary point of a three-dimensional object, a vector directed from this point to the origin of eye coordinate system defines the direction of projection. The view plane can be located anywhere with respect to the front and back clipping planes.

A perspective transformation transforms three-dimensional objects from an eye coordinate system to a device coordinate system. After this transformation, the parallel projection of the transformed object is the same as the perspective projection of the original object. Reference is now made to FIG. 2A and FIG. 2B, which are illustrations of a cube before and after perspective transformation.

Perspective transformed coordinates are useful because they not only reveal how an object on a view plane appears to the observer, but also how distant the object is from the observer in the z direction. The distance of an object from the observer in the z direction, determines which objects or surfaces appear "in front" and which appear "behind" to the observer. Therefore, the z coordinate is an important item used for determining hidden objects or surfaces or hidden portions thereof.

Every transformed three-dimensional geometric entity, has a corresponding two-dimensional projection, which is derived from the three-dimensional geometric entity by simply eliminating the z coordinate for each point and retaining the x and y coordinates.

Reference is now made to FIG. 3, which is an illustration of an object 20 defined by three-dimensional eye coordinates. Object 20 consists of two faces, a front face 22A and a back face 22B. The front face 22A is visible to the observer 24 and is subject to further processing. The back face 22B is oriented away from the observer, i.e., hidden from view, and can be quickly identified and removed based solely on it's orientation. The conventional back-face culling technique is a pre-processing step that can quickly identify and remove an object's back faces without regard to other surfaces and objects in the scene. If the surface of the three-dimensional object 20 is transparent then both surfaces 22A and 22B are visible to observer 24. In this case, a back face surface may be considered a front face and therefore, would not be removed during the back face culling routine.

In determining visible surfaces, a renderer has to remove hidden surfaces from the rendered scene. There exist many conventional techniques for removing hidden surfaces, including, z-buffer, scan-line, ray tracing, etc. These and other well-known techniques are disclosed in the publication "Introduction to Computer Graphics" by James D. Foley and others, published by Addison Wesley Publishing Co., and incorporated herein by reference. A main drawback of all the forgoing methods is the computational complexity. The number of required calculations in all the existing methods, such as z-buffer, scan-line, ray tracing, etc., is proportional to the total surface of objects of the scene.

U.S. Pat. No. 3,602,702 discloses an area-subdivision method of generating two-dimensional images of three-dimensional objects. In this method, the total area of a view plane is progressively divided into smaller subdivisions. As the subdivisions become smaller fewer polygons overlap each subdivision, and ultimately it is possible to decide which polygons are visible in the subdivisions. In order to determine visible polygons over a subdivision all the polygons, which are projected at least partially onto the subdivision must be checked. While this method can reduce the number of required calculations to a number which is smaller than that of other previously mentioned methods, nevertheless, the number of polygons, which must be checked is very high. Thus, a solution is needed which overcomes the deficiencies in the prior art.

SUMMARY

The present invention overcomes the aforementioned problems of the prior art by providing a more efficient solution to the problem of visible surface determination. Specifically, the solution presented herein substantially reduces the number of necessary calculations for determining the visibility of surfaces of three-dimensional objects by only checking for the visibility of projected surface boundary edges comprising a three-dimensional object. Moreover, the present solution eliminates the need to perform the additional computational step of clipping, as aspect of clipping is carried out during execution of the present solution. Hence, the present solution facilitates real-time rendering of complex three-dimensional scene, incurring less computational overhead than that of other methods known in the art.

Therefore in accordance with one aspect of the present solution there is provided a system, method and article of manufacture for determining the visibility of surfaces and/or parts of surfaces of three-dimensional objects, which are projected on a view plane from data defining these surfaces, comprising: a) deriving data indicative of boundaries of projections of the surfaces on the view plane; b) determining (preferably, by recursion) a finite number of subdivisions of the view plane thereby providing perimeters of each of the subdivisions; c) determining points of intersection of the perimeter of one of the subdivisions with the boundaries of the surfaces projected on the view plane; d) determining the distribution of surfaces visible along the perimeter of the of one of the subdivisions by utilizing the points of intersection; and e) determining if the one subdivision is "simple enough" of "terminal" from at least the distribution of surfaces visible along the perimeter of the one subdivision.

In accordance with another aspect of the present solution the visibility of surfaces and/or parts of surfaces of three-dimensional objects projected on a view plane are determined using one or more "minimal rectangles or subdivisions" as defined further herein.

These and other aspects, features and advantages of the present invention will become better understood with regard to the following description, appended claims, and accompanying drawings.

BRIEF DESCRIPTION OF THE DRAWINGS

Referring briefly to the drawings, embodiments of the present invention will be described with reference to the accompanying drawings in which:

FIGS. 13A illustrates an exemplary data structure for storing surface data in accordance with the teachings presented herein.

FIG. 20 illustrates an exemplary data structure of intersections in accordance with the teachings presented herein.

FIGS. 30A, 30B, 30C, 30D illustrate the progressive subdivisions of a view plane in accordance with the teachings presented herein.

FIG. 31 illustrates an exemplary method for determining the index of a rectangle from its name in accordance with the teachings presented herein.

DETAILED DESCRIPTION OF THE INVENTION

Referring more specifically to the drawings, for illustrative purposes the present invention is embodied in the system configuration, method of operation and article of manufacture or product, such as a computer-readable medium, for example, a floppy disk, a conventional hard disk, CD-ROM, Flash ROM, nonvolatile ROM, RAM and any other equivalent computer memory device, generally shown in FIGS. 1–31. It will be appreciated that the system, method of operation and article of manufacture may vary as to the details of its configuration and operation without departing from the basic concepts disclosed herein. The following detailed description is, therefore, not to be taken in a limiting sense.

1. Physical Configuration

Figure 1A:
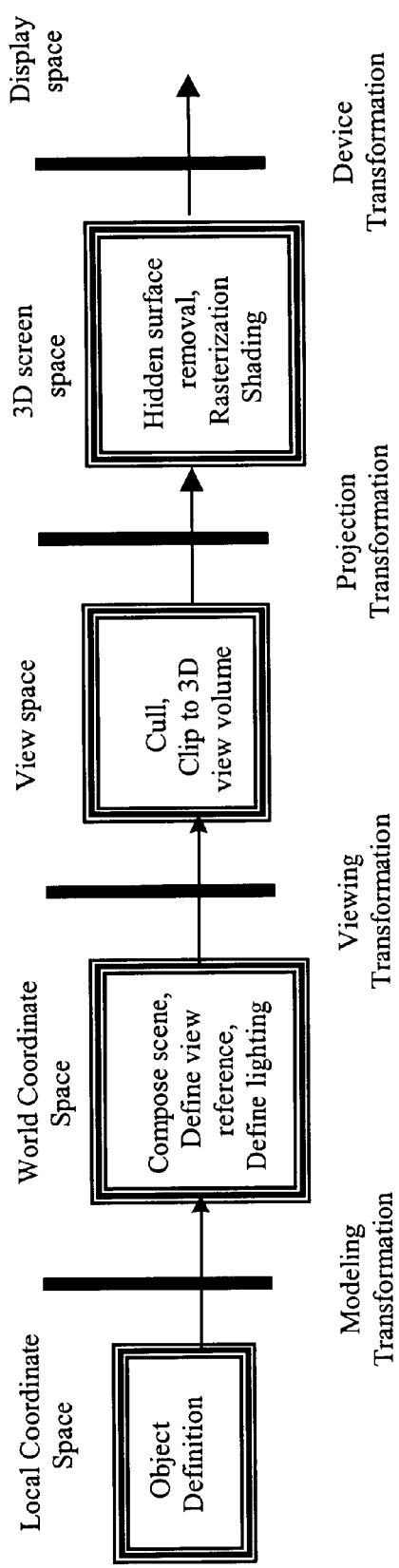
FIG. 1A illustrates a three-dimensional rendering pipeline.
Figure 1B:
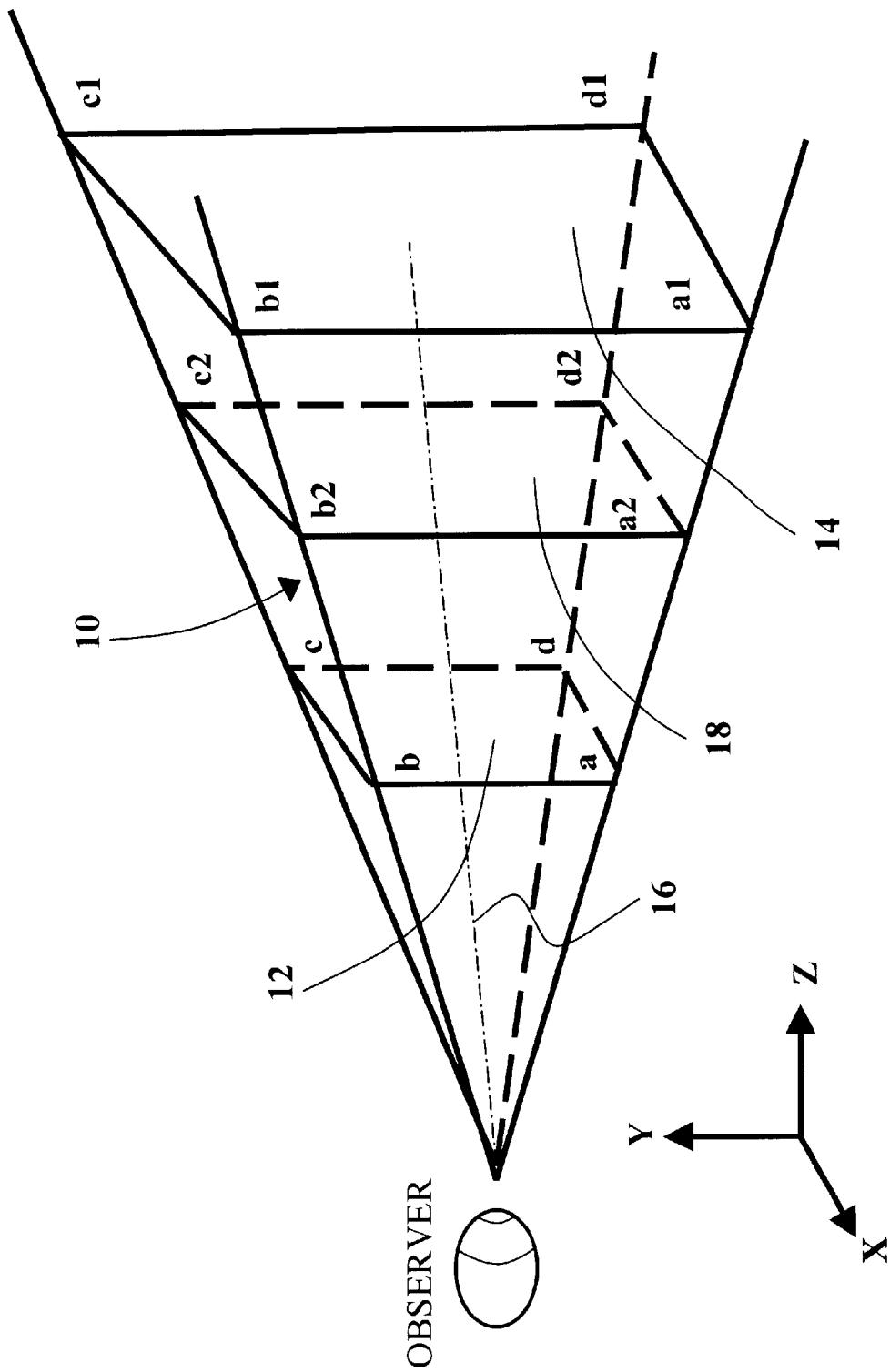
FIG. 1B illustrates a view volume defined by a frustum.
Figure 2B:
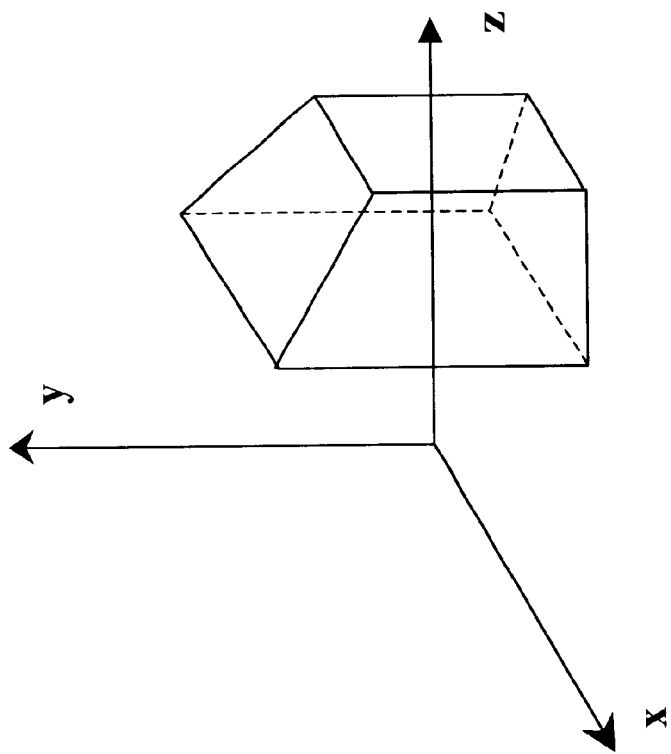
FIGS. 2A and 2B illustrates a before and after depiction of a cube transformed in accordance with a well-known technique.
Figure 2A:
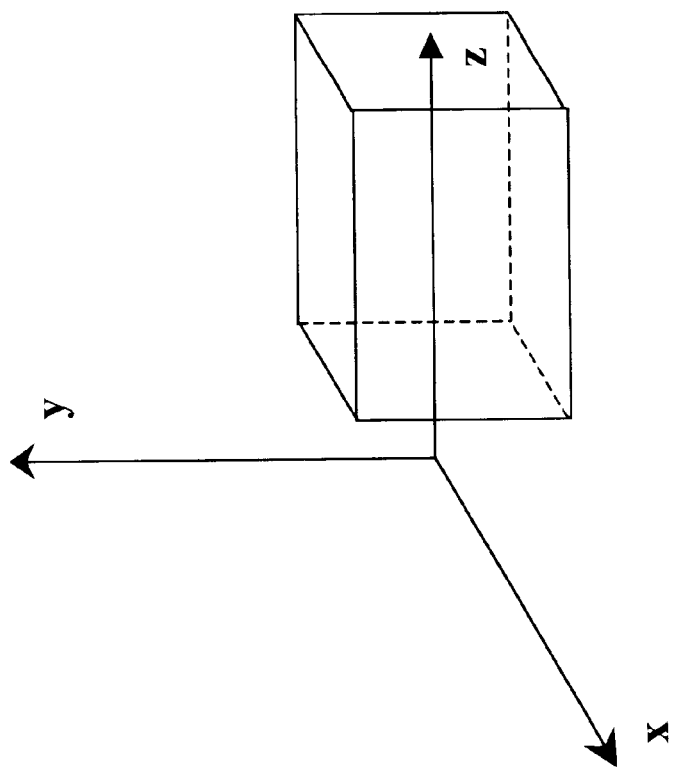
Figure 3:
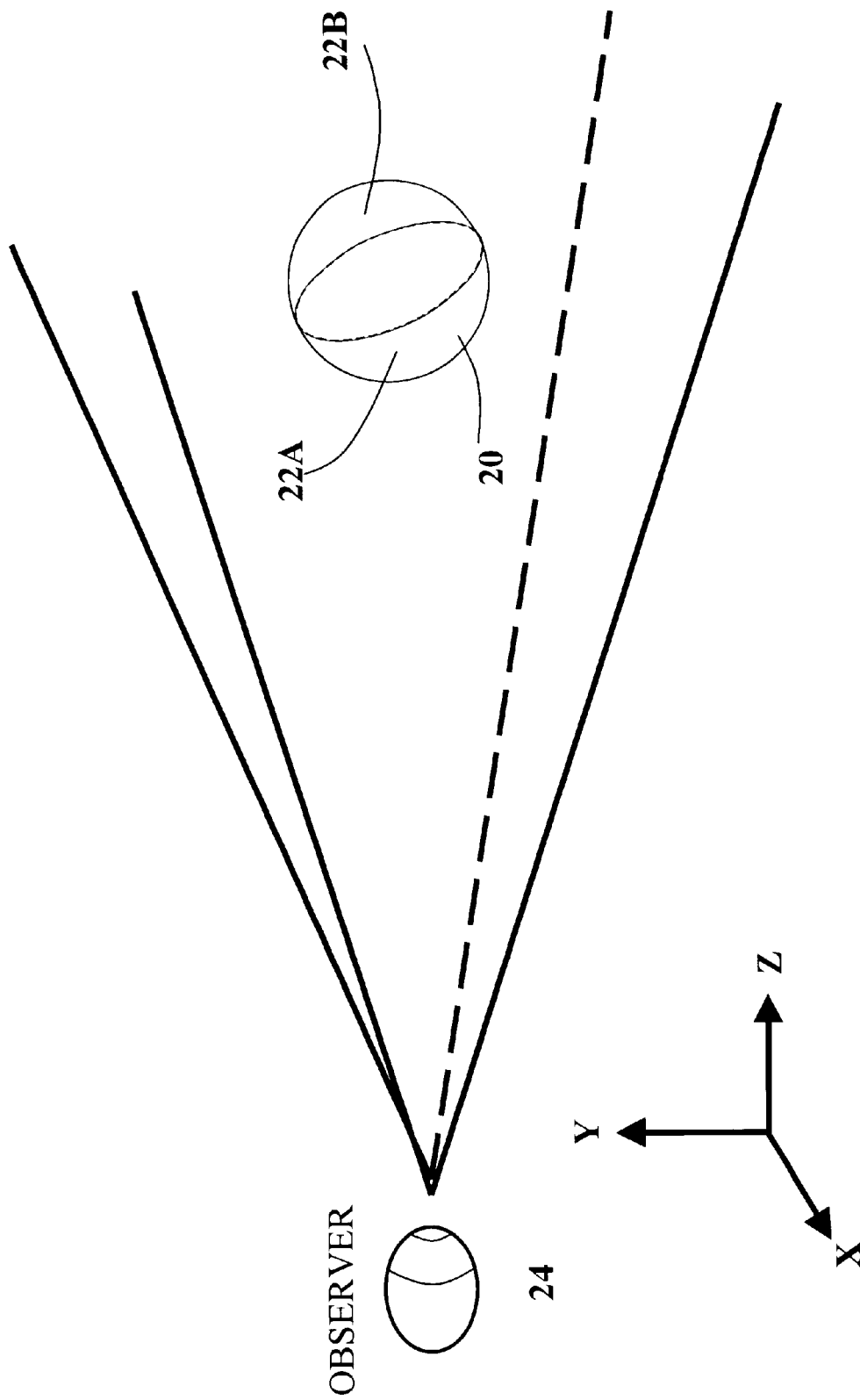
FIG. 3 illustrates a perspective view of an object in three-dimensional eye coordinates.
Figure 4:
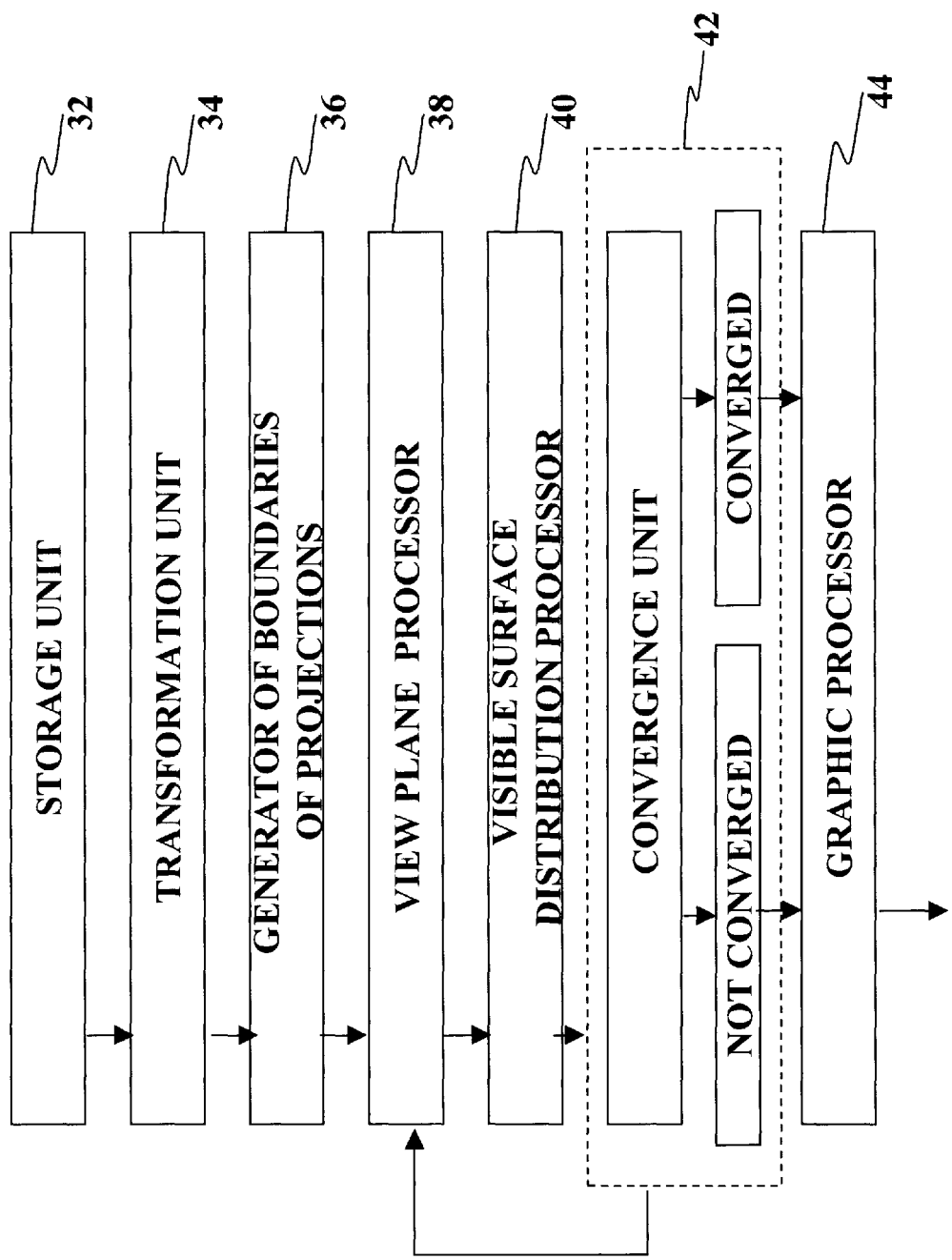
FIG. 4 is a schematic block diagram of one embodiment of a system in accordance with the teachings presented herein.

Referring to FIG. 4, there is shown a block diagram of a system constructed in accordance with the teachings of the present invention. In a basic embodiment, the system comprises a storage unit 32, a transformation unit 34, a projection unit 36, a view plane processor unit 38, a visible surface distribution processor unit 40 and a convergence unit 42. In another embodiment, the system may further include a graphics processor unit 44. The transformation unit 34 is connected to the storage unit 32. The projection unit 36 is connected to the transformation unit 34 and to the view plane processor 38. The view plane processor 38 is further connected to the visible surface distribution processor 40 and to the convergence unit 42. The convergence unit 42 is further connected to a graphic processor 44.

The storage unit 32 stores object data in a storage medium, such as a database, hereinafter also called a scene database. The transformation unit 34 processes the various transformations among coordinate systems. The projection unit 36 projects surface boundary edges on a view plane.

Figure 6:
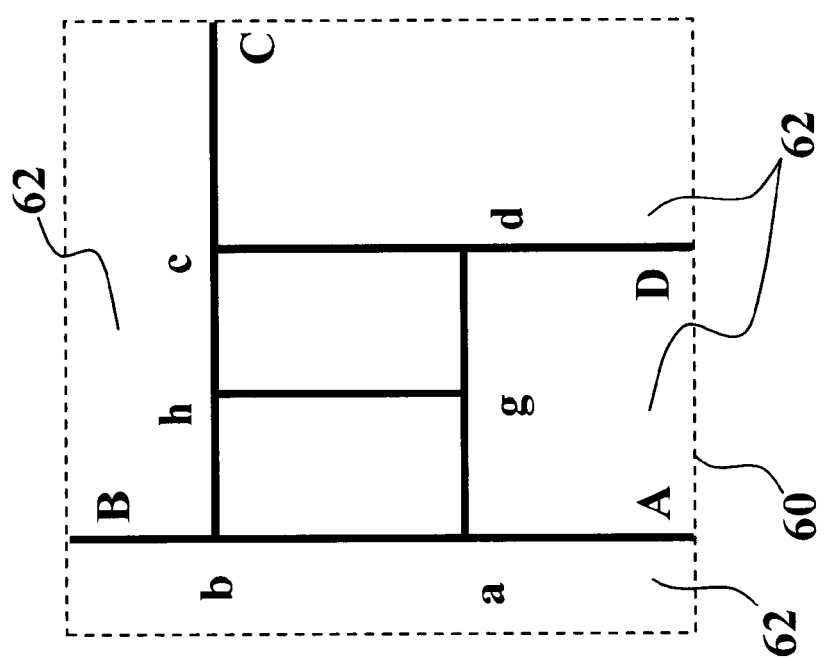
FIG. 6 illustrates arbitrary subdivisions of a view plane in accordance with the teachings presented herein.

The view plane processor unit 38 subdivides the view plane, i.e., the initial area, according to a particular mode of subdivision. While there are several conventional ways in which a view plane may be subdivided, in a one embodiment of the present solution, a view plane is subdivided according to the following general rule: starting from a certain initial rectangular region (usually the rectangular region representing the entire display surface), first split the region vertically such that the two resulting "child" subdivisions are equal in size. Thereafter, split all subsequent subdivisions into two child subdivisions of equal size from left to right, top to bottom with each division line being perpendicular to the last one such that the view plane can be ultimately divided into a plurality of progressively smaller rectangular subdivisions. FIGS. 30A, 30B, 30C, 30D illustrate a series of views of a view plane 60, which is subdivided in accordance with the above teachings. FIG. 6, illustrates an example of a subdivided view plane 60. The view plane 60, is subdivided by division lines AB, bC, cD, da and gh. Subdivision abcd is an initial rectangular area. Equal subdivisions (rectangles) abhg and ghcd result from subdividing abcd with division line gh. Division line gh is perpendicular to the last division line da, which formed the contour of subdivision. Subdivisions abcd, abhg and ghcd are bounded by closed contours consisting of segments of lines AB, bC, cD, da and gh. Subdivisions 62 are bounded by segments of lines AB, bC, cD, da, which do not form closed contours.

The visible surface distribution unit 40 determines all visible surfaces associated with an initial area or a subdivision. The convergence unit 42 checks whether an initial area or a subdivision satisfies certain terminal conditions to be described in detail below. Finally, one of several functions of the graphics processor 44 is to process all visible surfaces determined in the previous components/units to produce a final image for display on an output device.

II. Overall Solution

Reference will now be made to several Figures, which together describe in detail the overall solution.

Storing Objects

Previously modeled object data, intended for constructing a three-dimensional scene, may be stored in any type of user defined data structure. Objects may be represented by one or more flat polygons. Objects may also be represented by surfaces of higher order, such as, for example, quadric surfaces or bi-cubic surfaces. The limitations for presentation of data with higher order surfaces will be discussed in the appropriate places herein below. Herein, objects will be defined as a set of flat polygons, preferably, as a set of triangular polygons and stored in a plurality of arrays.

Figure 12A:
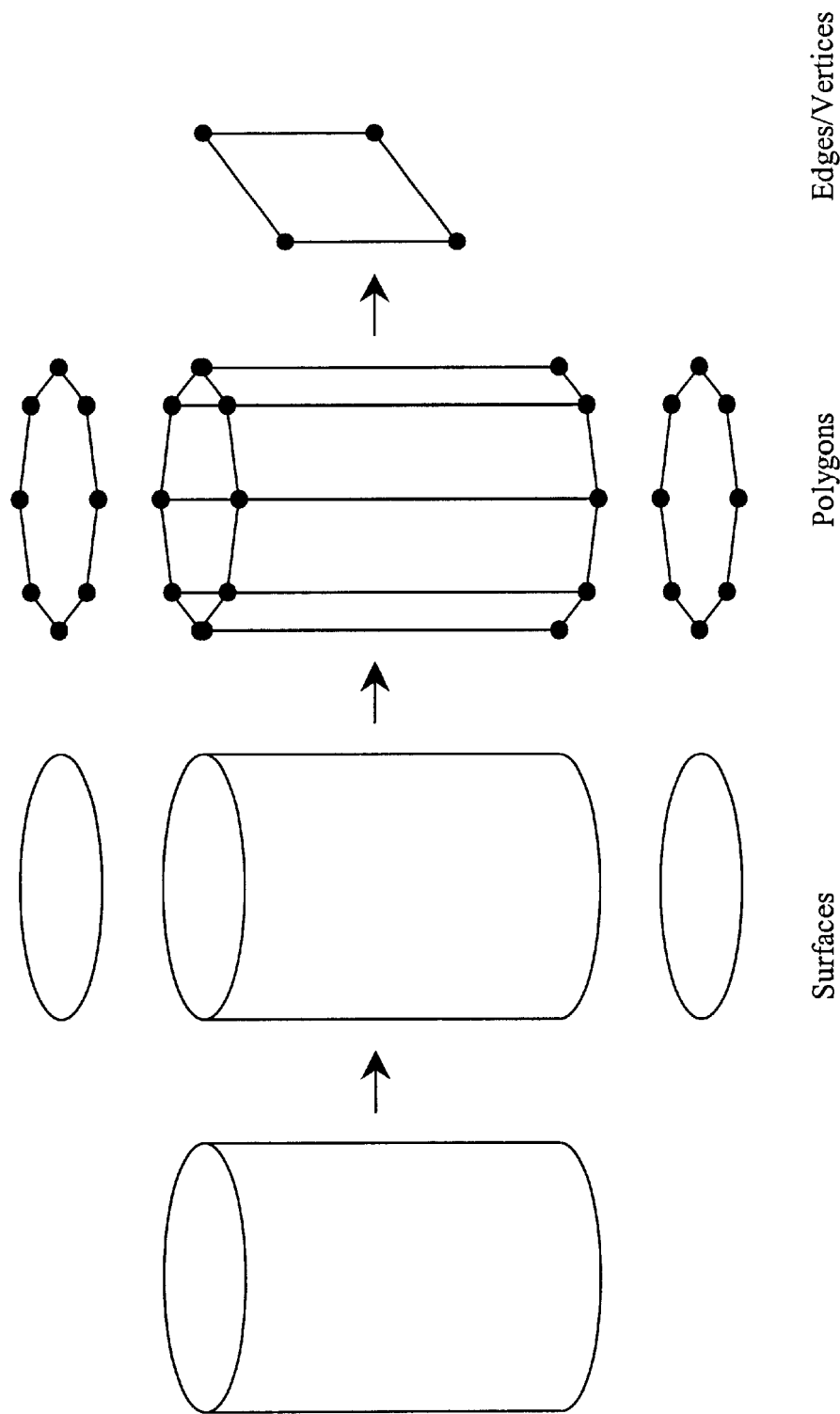
FIGS. 12A & B illustrate an exemplary data structure intended for storing object data and vertex data comprising a scene in accordance with the teachings presented herein.
Figure 12B:
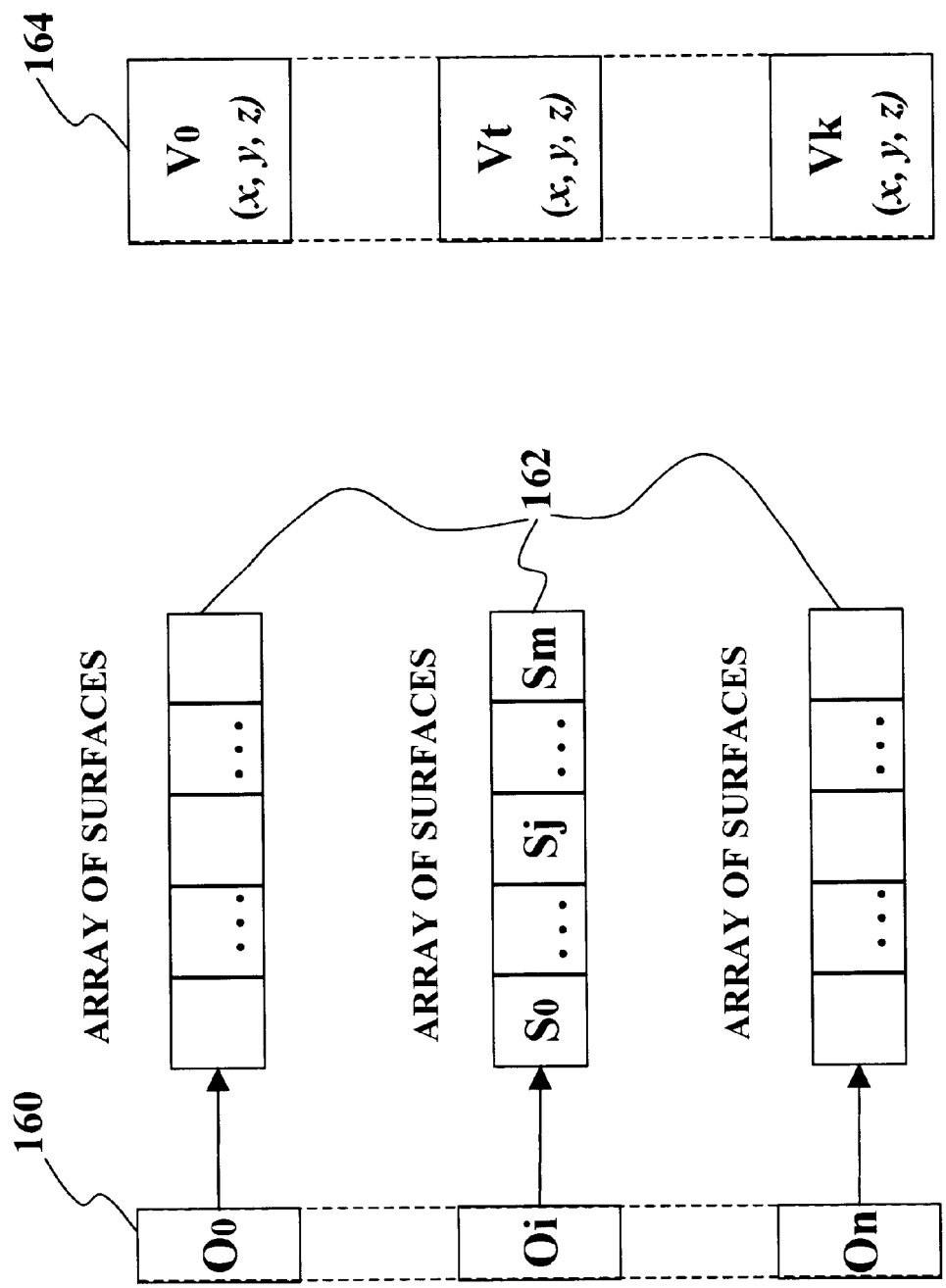

FIGS. 12A–12B illustrate several high-level representations of object data. FIG. 12A illustrates a conceptual hierarchy of an object's decomposition in which the vertices and/or edges comprising the object is grouped into polygons, these polygons are grouped into surfaces and finally, these surfaces are grouped into the object. As is shown, an object, namely, a cylinder, possesses three surfaces: a planar top surface, a planar bottom surface and a curved surface. Each of these surfaces is decomposed into polygons, and each of these polygons is further decomposed into vertices and/or edges.

FIGS. 12B, 13 and 14 are examples of practical data structures each of which may be used herein to store object data.

Array of Vertices

A vertex is a point in three-dimensional space, which is characterized by three coordinates, x, y, and z. As is shown in FIG. 12, in one embodiment of the present solution, all vertices, which define the three-dimensional scene are collected and stored in a global array, namely, an array of vertices 164, which is common for the entire scene. It is appreciated however that other storage modes are equally suitable, including, for example, storing the vertices of each object in a separate array or storing the vertices of each surface in a separate array. Moreover, additional geometric information can be determined once and stored in the array of vertices, e.g., the coordinates of a vertex normal, to be used in subsequent processing.

Array of Objects

As is shown in FIG. 12, an object array 160 stores information relating to each object in the scene. Namely, each object of the scene is stored in an array element of the object array 160. Each array element of the array of objects 160 references an array of surfaces.

Array of Surfaces

The array of surfaces contains all the surfaces, which make up a particular object. Each surface of the object is stored in a separate array element 170 of the surface array 162.

FIG. 13A is a more detailed view of the array of surfaces 162. As is shown, surface array elements 170 of array of surfaces 162 reference two arrays, namely, an array of polygons 172, which approximate a surface, and an array of surface boundary edges 174, which, as the name implies, is an array that stores all the boundary edges of a given surface.

Array of Polygons

Figure 13B:
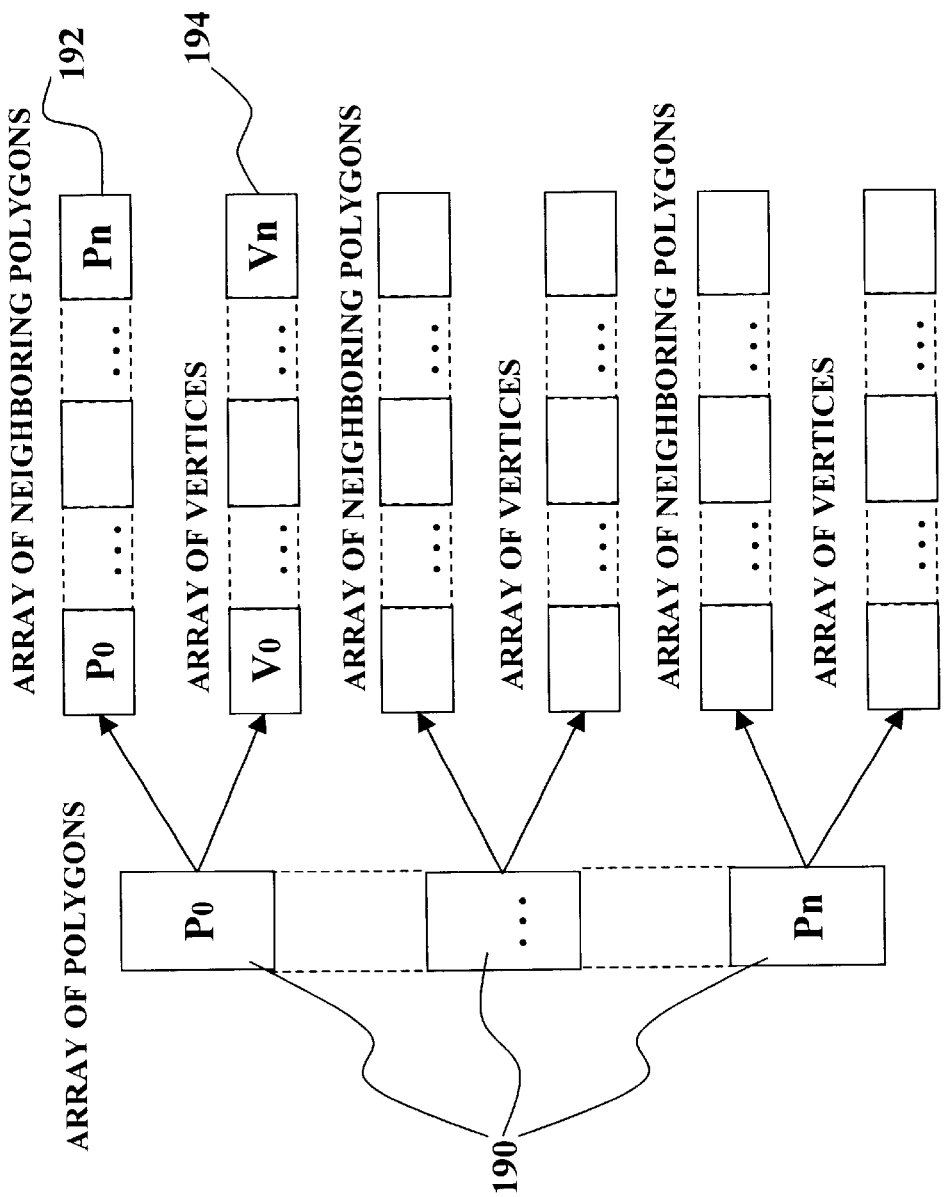
FIGS. 13B illustrate an exemplary data structure for storing polygon data in accordance with the teachings presented herein.

Each surface can be further represented by one or more polygons. Reference is now made to FIG. 13B, which is a more detailed view of the polygon array in accordance with the teachings herein.

As shown in FIG. 13B, each array element of the array of polygons further references two arrays, namely an array of references to an array of vertices and an array of neighboring (adjacent) polygons.

The polygon elements in an array of polygons contain special flags, which are utilized in the invention. These flags define visibility of polygon and some intermediate data.

A polygon is uniquely determined by a set of vertices. The first array in polygon element is an array of references to vertices in an array of vertices. References in an array of references are stored in such a manner that vertices of polygon are ordered in clockwise direction.

The edges of a polygon can be determined since a pair of neighboring references to an array of vertices determines an edge of a polygon. Moreover, the pair of references consisting of the first and last element in the array of references also determines edge.

A polygon's edge can be designated by only one reference to an array of vertices. The second vertex determining the edge can be found from the neighboring element in array of references to vertices as was mentioned herein above.

Array of Neighboring Polygons

The second array is an array of references to the neighboring (adjacent) polygons (i.e. other elements of the same array of polygons), include references to those polygons which have one common edge with that polygon. Where there is no neighboring polygon, that is, where there is a boundary edge of a surface, a null value or zero, is inserted in the array.

Array of Surface Boundary Edges

The array of boundary edges for a surface include those edges, which are surface boundary edges. Each array element of this array comprises a polygon field which indicates the polygon to which the edge belongs and a vertex field which references vertices by indirectly referencing one entry in the array of vertices.

Figure 14A:
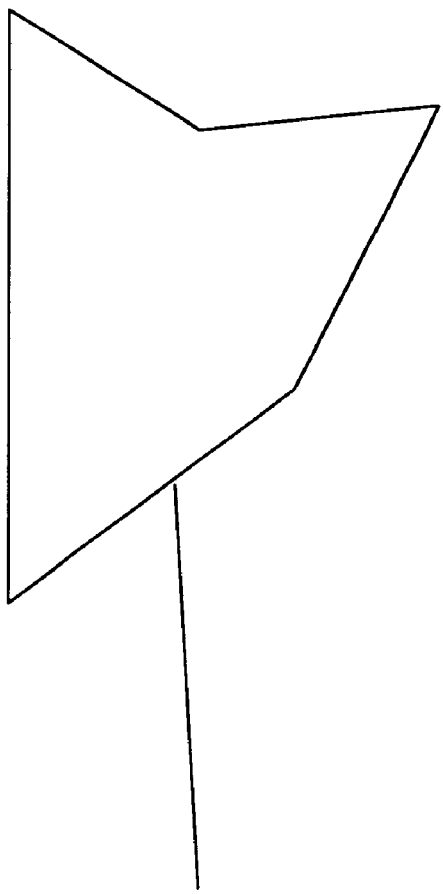
FIGS. 14A–C illustrate an example of a surface stored as triangular polygons in accordance with the teachings presented herein.
Figure 14B:
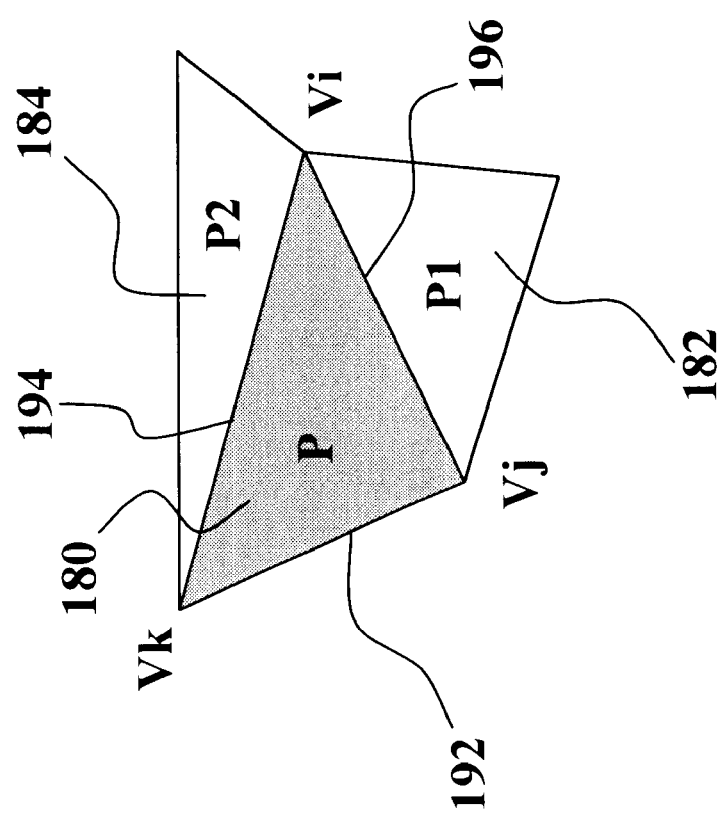
Figure 14C:
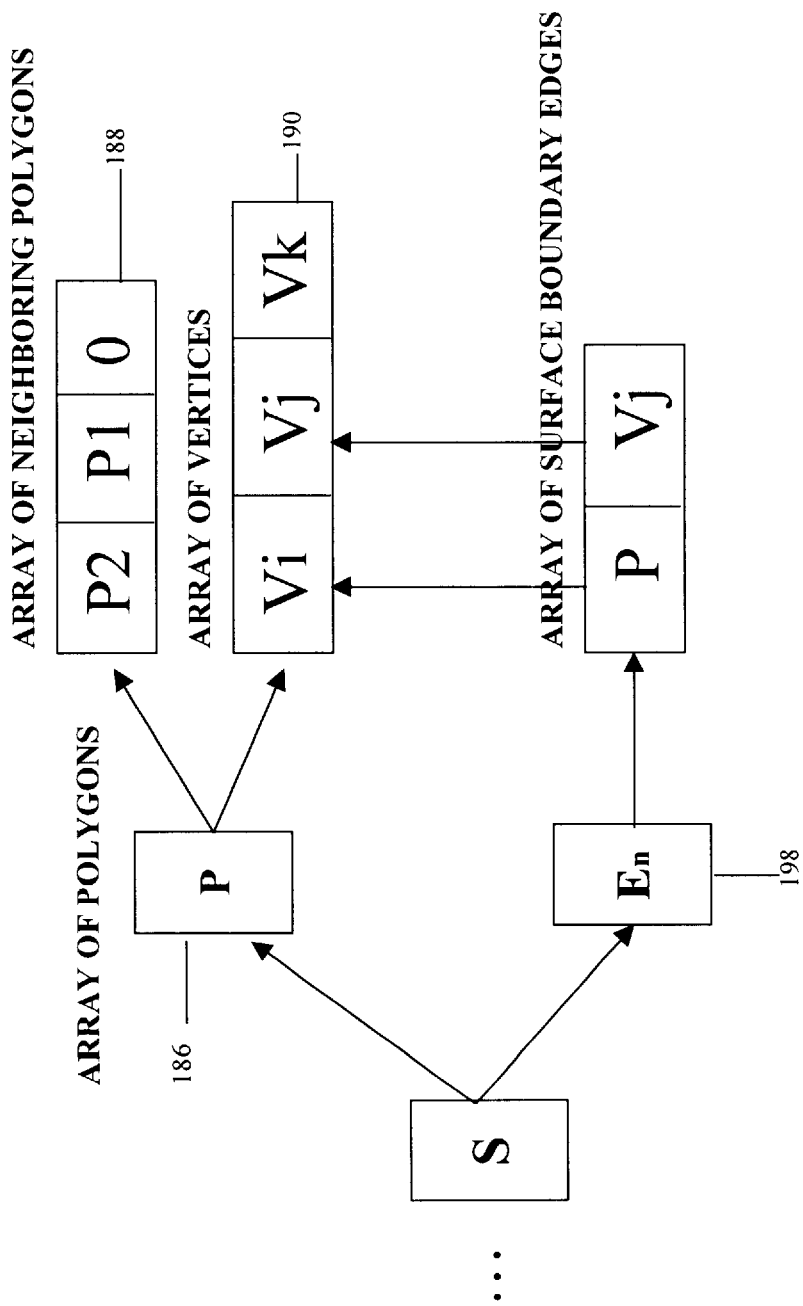

Reference is now made to FIGS. 14A–C. FIG. 14B illustrates a polygonal representation of an arbitrary surface S of an object having three polygons P, P1 and P2, designated with the numerals, 180, 182 and 184 respectively.

As shown in FIG. 14C, polygon P is represented by an array element 186 of a polygon array. Array element 186 further references an array of references to vertices 190 (for simplicity, we show only vertices themselves but not references) and an array of neighboring polygons 188. Array 190 includes the references to vertices Vi, Vj and Vk of polygon P. Array 188 includes neighboring polygons P1 and P2 which are adjacent to P. The last element in array 188 is zero because edge 192 having vertices Vj and Vk is a boundary edge of the surface S and consequently, has no neighboring polygon.

As shown in FIG. 14C, surface boundary edge 192 includes in its polygon field a reference to polygon P (the polygon to which it belongs) and in its vertex field an indirect reference, to vertex Vj of polygon P (the first vertex of edge 192 moving in a clockwise direction.) As herein indicated, vertex Vk of edge 192 need not be stored.

A three-dimensional scene description must be processed through transformations and projection routines that transform three-dimensional world coordinates into two-dimensional viewing coordinates. The next section describes exemplary transformation routine(s), which may be used in the present solution, followed by a section describing exemplary projection routine(s), which may also be used in the present solution.

Transformations among Coordinate Systems

Herein, a viewing transformation of a three-dimensional scene is carried out in the following manner: First, a description of the three-dimensional scene is constructed in world coordinate space using modeling transformations. Second, only the world coordinate description of surface boundary edge data of all surfaces in the scene is transformed into viewing coordinates. That is, only vertices associated with a surface boundary edge is transformed. Thus, all transformations are applied to a limited subset of vertices. Furthermore, the conventional projection or view plane, view volume, view port and window are all defined and constructed in the viewing coordinate system. Third, the viewing coordinates description of all surface boundary edges are mapped to normalized viewing coordinates. Fourth, a normalized transformation is applied to the normalized viewing coordinates so that the view volume is transformed into unit cube, which extends from 0 to 1 in each of the three dimensions. The viewport, i.e., the rectangular region on the screen on which the scene is mapped in normalized viewing coordinates, extends from 0 to 1 in both the x and y coordinate directions.

During the transformation stage, all transformations are applied to a limited subset of vertices.

Figure 15:
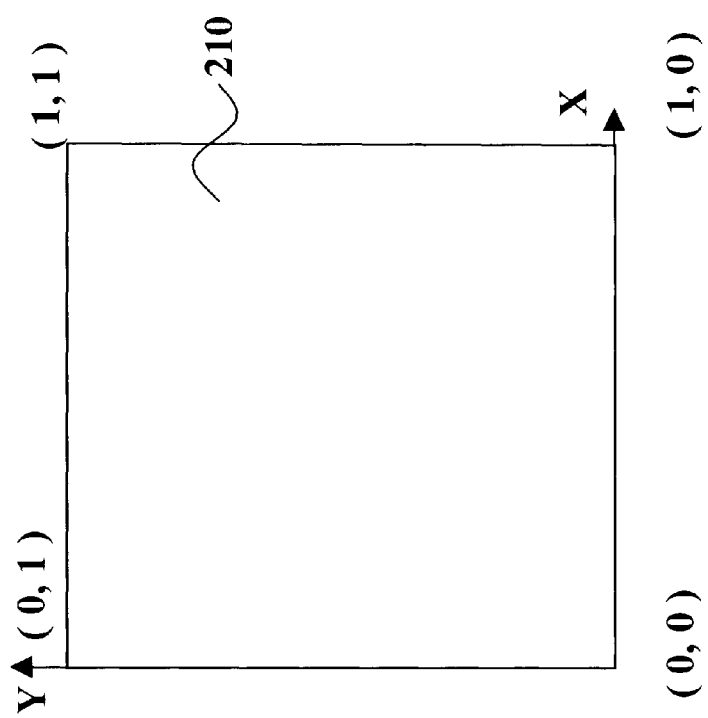
FIG. 15 illustrates an exemplary normalized coordinate system in accordance with the teachings presented herein.

FIG. 15 illustrates one aspect of the aforementioned viewing transformation pipeline corresponding to the normalized-coordinate mapping. As indicated, the origin of the two-dimensional orthogonal coordinate system on a view plane is chosen in one of the corners of rectangular subdivision 210. Coordinate axes coincide with the sides of rectangle. Normalized coordinates are chosen so that points (1,0), (0,1) and (1,1) coincide with corners of rectangle. In this coordinate system an initial rectangular area or subdivision is mapped into a square with unit sides. All coordinates of projections vertices are transformed into this coordinate system.

Having transformed the necessary data, projection of this data is done. The next section describes exemplary projection routine(s), which may be employed herein.

Projection of Surface Boundary Edge Data

Transformed surface boundary edge data comprising the three-dimensional scene is projected onto a view plane according to well-known techniques. Generally speaking, projection can be defined as a mapping of point P (x, y, z) onto its image P' (x', y', z') in the projection or view plane, which typically constitutes a display surface. Conventional methods of projection include perspective and parallel projection.

Figure 5:
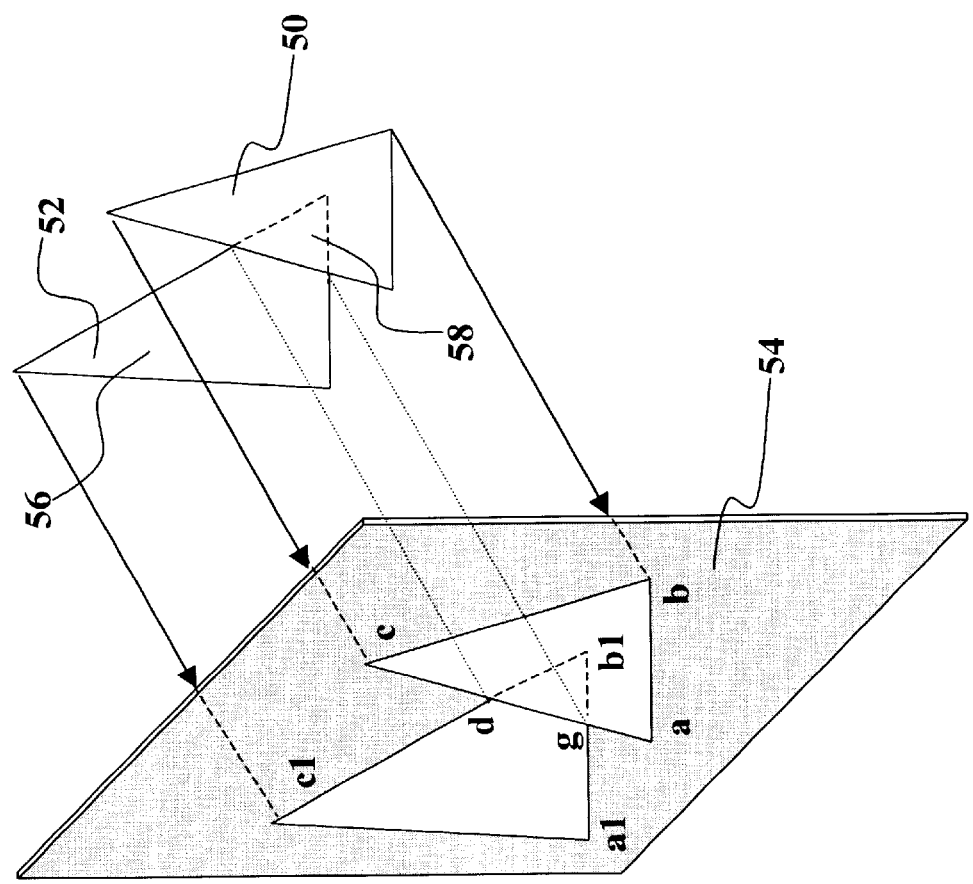
FIG. 5 illustrates projections of surfaces on a view plane in accordance with the teachings presented herein.

FIG. 5 illustrates a view plane 54 having surface projections 50 and 52 thereon. Surfaces 50 and 52 in three-dimensional space are projected onto regions abc and a1b1c1 on the view plane 54. Part 56 of surface 50 is projected onto region a1c1dg of a view plane. The line abc is a boundary line of projection of surface 50.

Figure 7A:
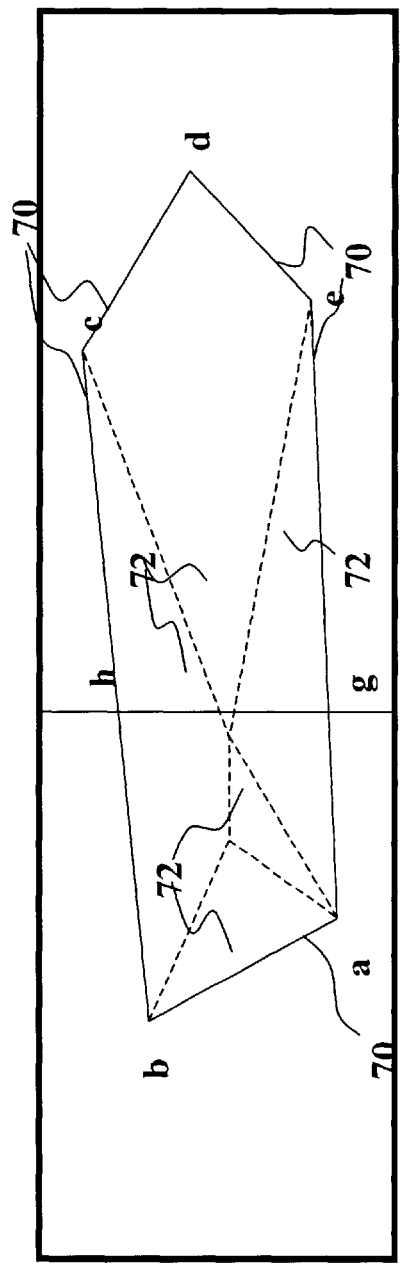
FIG. 7A illustrates a projection on a view plane of a surface approximated by flat polygons in accordance with the teachings presented herein.

Reference is now made to FIG. 7A, which illustrates the projection on a view plane of a surface, approximated by several flat polygons designated by the numeral 72. The projection of boundary of surface is represented by projections 70 of edges denoted by ab, bc, cd, de, ea.

What now follows describes the heart of the present solution, namely a unique method of determining visible parts of surfaces using projected surface boundary information. In the present invention, parts of a surface could be either points (elementary areas) that are on the surface, or larger areas (e.g. flat polygons) forming that surface. A part of a surface is considered visible if at least one point belonging to the part is visible, i.e. a projection line connecting this point with an observer does not intersect with any nontransparent surface. Referring to FIG. 5, surface 52 consists of two parts 56 and 58. Visible part 56 of surface 52 is projected onto region a1c1dg on the view plane 54. Part 58 of the surface 52, which is projected into the region gdb1, is hidden if the surface 50 is opaque; otherwise it is visible.

Hereinafter, the term "edge" shall refer to both an edge in three-dimensional space and an edge projected on a two-dimensional view plane, unless stated otherwise.

Visible Surface Determination

During the process of determining visible surfaces, certain data structures are used. The following section describes these data structures in detail.

Arrays for Minimal Rectangles/Subdivisions

Knowing that a view plane will be subdivided in accordance with a predefined mode of subdivision, the notion of a "minimal rectangle" or "minimal subdivision" will now be introduced. As used herein, a minimal rectangle or subdivision for an entity is that rectangular area or subdivision on a view plane which completely contains the entity and which cannot be subdivided by the preferable mode of subdivision described herein without dissecting/intersecting the entity contained within the subdivision. (Hereinafter, the term "minimal rectangle" will be principally used to describe a rectangle/subdivision).

In the present solution, minimal rectangles for all projected surfaces (also called surface projections) and projected surface boundary edges are constructed. Based on the above definition, a minimal rectangle for a projected surface boundary edge is that subdivision which contains the projected surface boundary edge and which cannot be further subdivided by the mode of subdivision herein described without dissecting/intersecting the edge. A minimal rectangle for a projected surface and/or polygon is defined in a similar manner. That is, a minimal rectangle for a surface projection is that subdivision which contains the surface projection. Moreover, this minimal rectangle cannot be further subdivided by the mode of subdivision herein described without dissecting/intersecting at least one of the surface's boundary edges. A general procedure for determining a minimal rectangle for a surface projection is as follows: 1) determine the minimal rectangle for each surface boundary edge of the surface projection; and 2) determine the greater of the minimal rectangles determined in the previous step. The greater of the minimal rectangles is the minimal rectangle for the surface projection.

Figure 16:
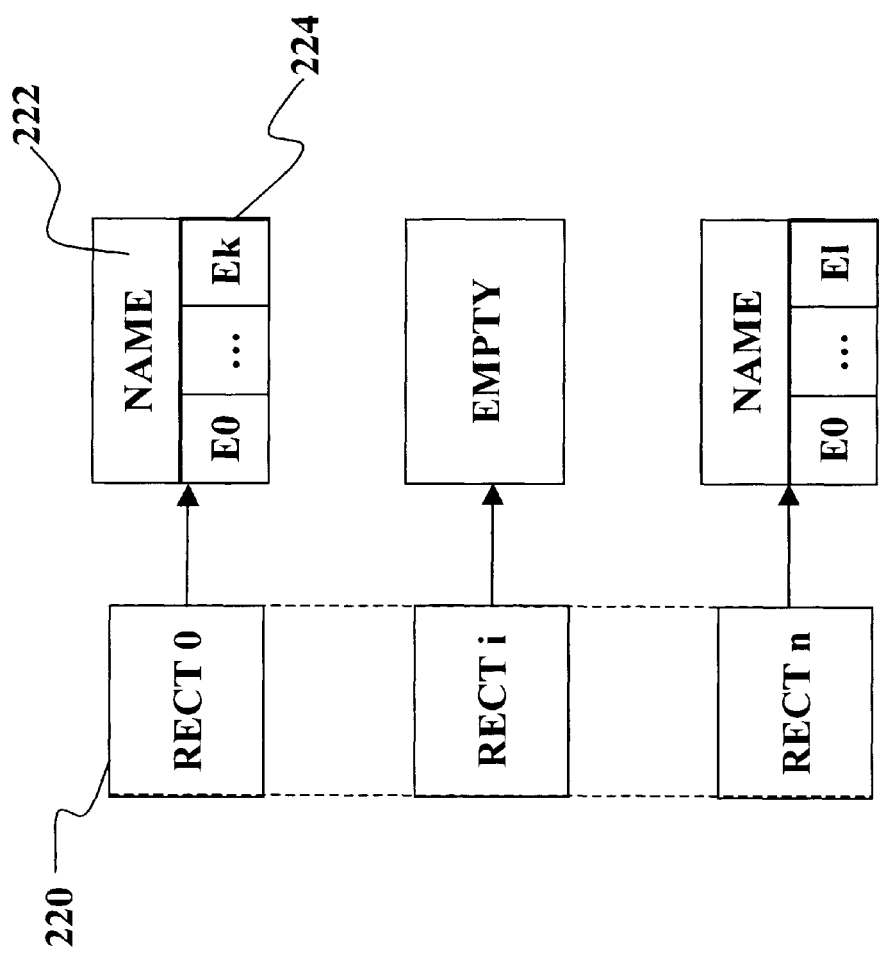
FIG. 16 illustrates an exemplary data structure of minimal rectangles for projected surface boundary edges in accordance with the teachings presented herein.
Figure 18:
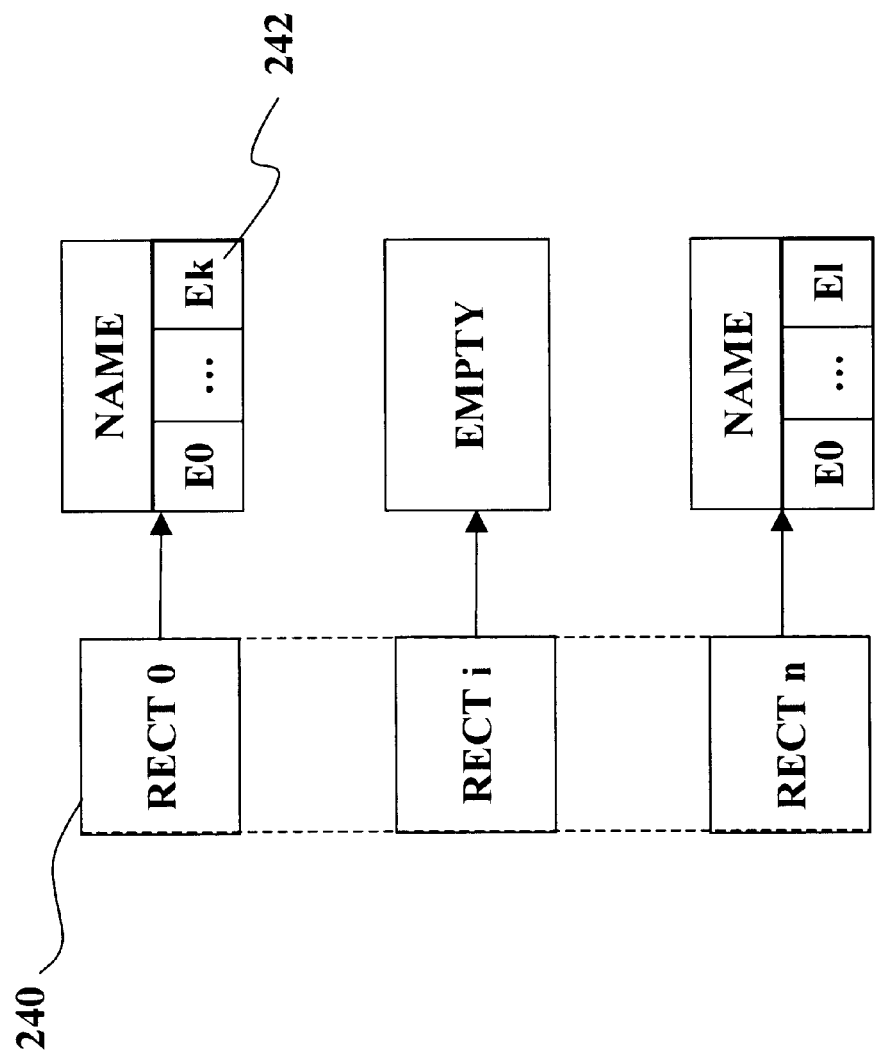
FIG. 18 illustrates an exemplary data structure of minimal rectangles for surface projections in accordance with the teachings presented herein.

Reference will now be made to FIGS. 16 and 18. Collectively, all minimal rectangles for projected surfaces comprising the scene and all minimal rectangles for projection surfaces comprising the scene are stored, in the present instance, in separate array data structures, namely, an array of minimal rectangles for projected surface boundary edges 220 (See FIG. 16) and an array of minimal rectangles for surface projections 240 (See FIG. 18). However, it is appreciated, that only one array of minimal rectangles need be used.

Figure 17:
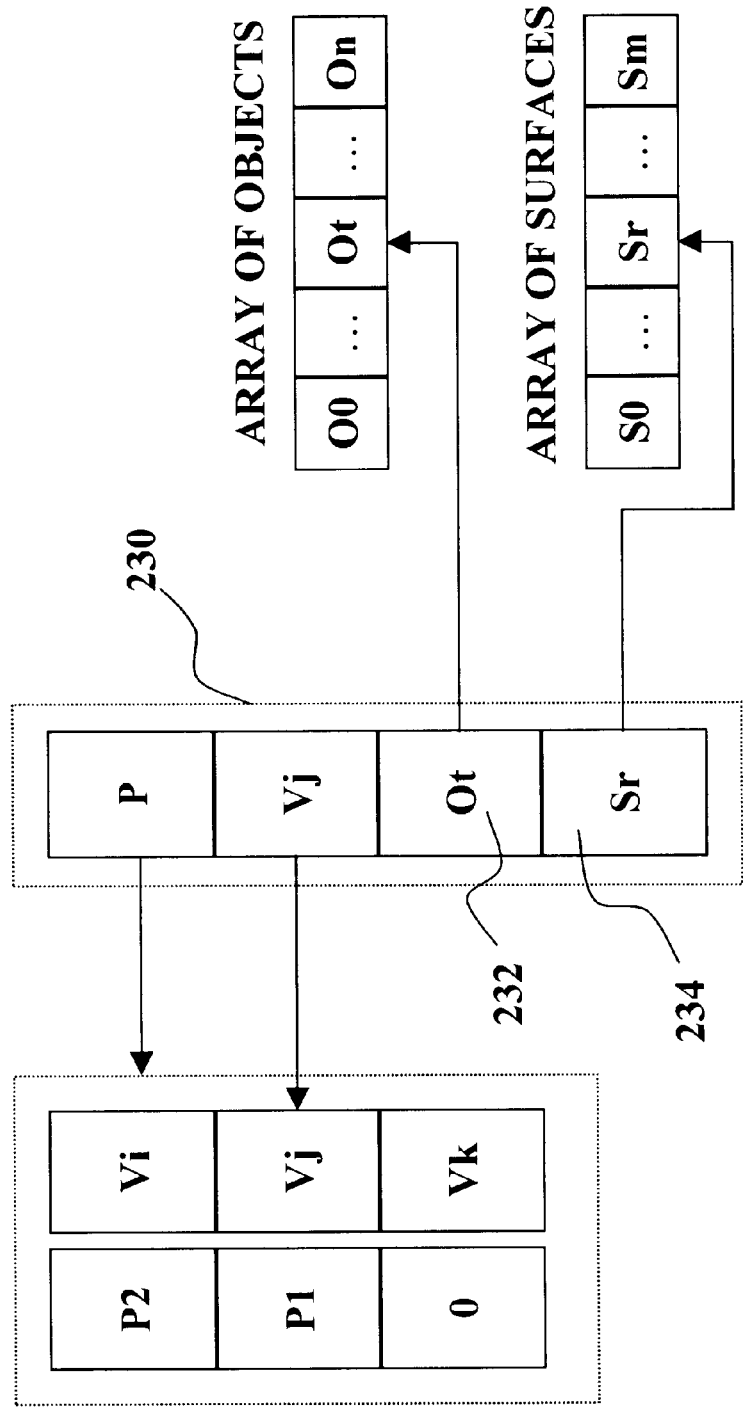
FIG. 17 illustrates an exemplary surface boundary edge data structure in array of all rectangles in accordance with the teachings presented herein.

As previously stated, each minimal rectangle corresponds to a region of a view plane, either the initial area or a subdivision. Therefore, each array element in either array of minimal rectangles 220 or 240 corresponds to a particular subdivision of the view plane. Moreover, as is shown in FIG. 17, each array element in either array of minimal rectangles 220 or 240 references a data structure, which includes a name field and a surface boundary edge field. The name field stores the "name" of the rectangle/rectangular region. The surface boundary edge field stores an array of all projected surface boundary edges, which belong to the referenced minimal rectangle, that is, all surface boundary edges for which the referenced rectangle is minimal. Each array element of this array of all surface boundary edges for a minimal rectangle includes a polygon field which references the polygon to which the edge belongs, a vertex field which indirectly references one vertex in the vertices array belonging to the edge; an object field which references the object in the object array to which the edge belongs, and a surface field which references the surface in the array of surfaces to which the edge belongs.

A minimal rectangle for surface projections can be determined by traversing the boundary edges of projected surface. All minimal rectangles for projected surfaces can be determined and stored in a separate array, called an array of minimal rectangles for surface projections. If stored in a separate array as is the case in FIG. 18, each array element of the array of minimal rectangles for surface projections references all surfaces for which this rectangle is minimal. Each surface is represented by one of its boundary edges as it was mentioned herein above.

The length of the array(s) of minimal rectangles, i.e., the maximum number of elements in the array(s) of minimal rectangles, is based on a predefined size of the smallest subdivision. Generally, the smallest size of a subdivision is determined in accordance with the desired image quality. Typically, this occurs when the smallest size of a subdivision is an order of pixel size. However, the smallest subdivision may be defined according to the natural limitations of the task. For example, in certain instances the smallest predefined subdivision may be greater or less than a single pixel size. Accordingly, the length of the array(s) is equal to 2*N−1, where N is maximum number of subdivisions of the smallest predefined size.

Moreover, each rectangular subdivision is given a "name" in accordance with the following method: First, decimal coordinates x and y of end points of projected surface boundary edge are converted to binary formal as is demonstrated in FIG. 6. These binary representations are copied into binary strings omitting the "decimal" point. (The term "decimal" point as used herein means the "." before the fractional part of the number). The maximal possible length of the name of subdivision is determined by the size of the smallest subdivision. The smallest subdivision is chosen by task context.

Figure 32:
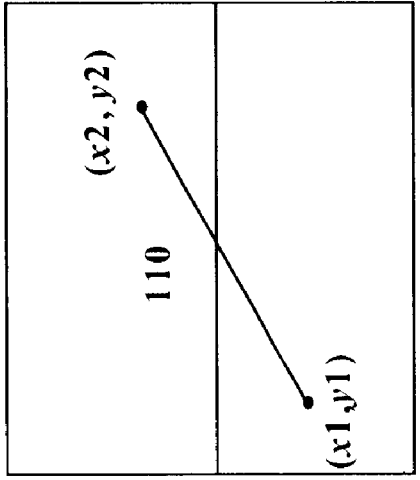
FIG. 32 illustrates an exemplary method for naming a minimal rectangle in accordance with the teachings presented herein.

The equivalent initial part of the binary strings (For x coordinates of two end points of projected surface boundary edge) is determined. This part is denoted by the vertical doted line in FIG. 32. The equivalent initial part of the two binary strings for the x-coordinate is further defined as the x-coordinate prefix. The same calculation of the y-coordinate prefix is executed for y-coordinates of a projected surface boundary edge. The name of the minimal subdivision is combined from the x-coordinate prefix and the y-coordinate prefix according to the following procedure. If the x-coordinate prefix is empty then the name of minimal subdivision coincides with the name of initial subdivision, which is EMPTY. Otherwise, the name is constructed by copying in turn one symbol from the x-coordinate prefix and then one symbol from the y-coordinate prefix in as is shown in FIG. 32, repeating this process until all the symbols in both prefixes are exhausted.

Using this procedure, minimal rectangles for projected surface boundary edges and projected surfaces may be determined using only the coordinates of the endpoint of the projected surface boundary edges. Therefore, minimal rectangles for projected surface boundary edges and projected surfaces may be determined in advance without actually subdividing the view plane.

Given the name of a minimal rectangle, an array index for the array(s) of minimal rectangles may now be determined based on the name of rectangle. What follows is one example of determining an array index from the name of a minimal rectangle.

Index zero (0) corresponds to the initial rectangle having EMPTY as its name. For left or bottom rectangles resulting from division of the view plane, unity (1) is added to the number of rectangle, which was divided. For right or top rectangles resulting from division of the view plane, the number of the subdivisions/rectangles in the left or bottom rectangles is added to the number of the rectangle, which was divided.

Figure 31:
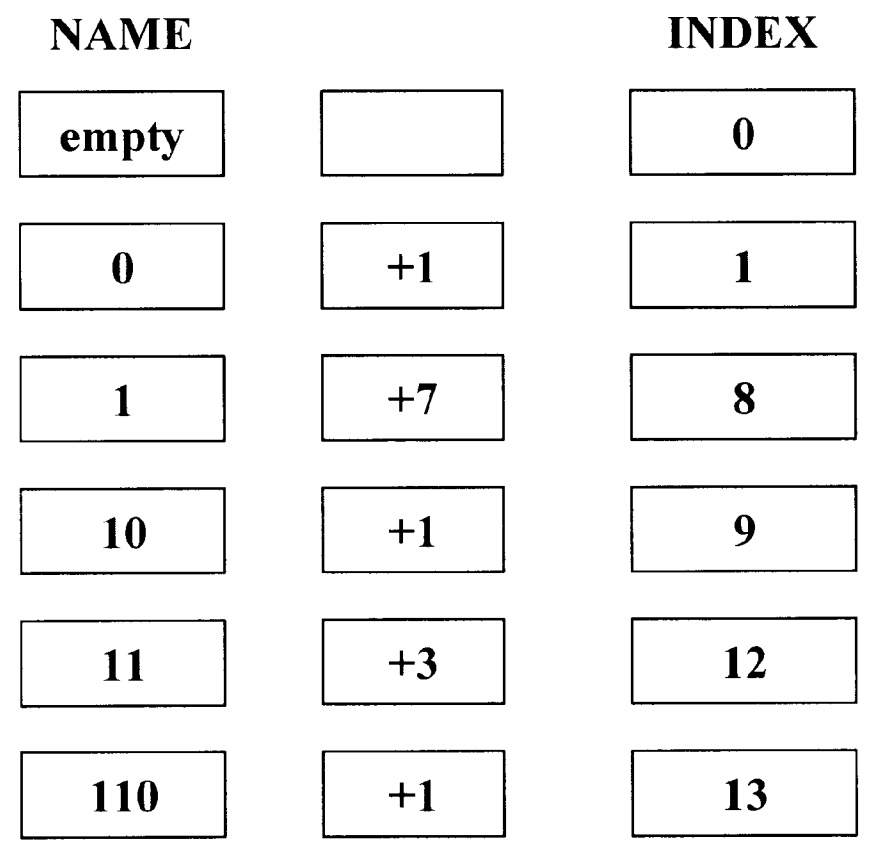

Reference is made to FIG. 31. Indices of rectangles in array of minimal rectangles are calculated from names of rectangles demonstrated in FIGS. 30A, 30B, 30C, 30D. In this particular example the total number of minimal subdivisions/rectangles is equal to eight.

In sum, the arrays of minimal rectangles for projected surface boundary edges and for surface projections are constructed as follows:

For all surface boundary edges:
  1) The name of minimal rectangle is determined from the coordinates of end points of edge.
  2) The entry number (index) in array of all rectangles for edges is calculated from the name of minimal rectangle.
  3) The edge is stored in array of edges corresponding to entry number defined on the previous step.

For all surface projections:
  1) The name of minimal rectangle is determined from the coordinates of end points of each edge.
  2) The name of maximal of these minimal rectangles is defined as a name of minimal rectangle for the surface.
  3) The entry number (index) in array of all rectangles for surfaces is calculated from the name of the rectangle.
  4) The edge corresponding to this rectangle is stored in array of surfaces corresponding to entry number defined on the previous step.

The array(s) of minimal rectangles can be initially constructed in the beginning of the method of the present invention. Thereafter, as new "child" surface boundary edges are formed as a result of division line dissection of a "parent" surface boundary edge (to be discussed in detail below), these new edges are dynamically added to the array of minimal rectangles for surface boundary edges.

Figure 7B:
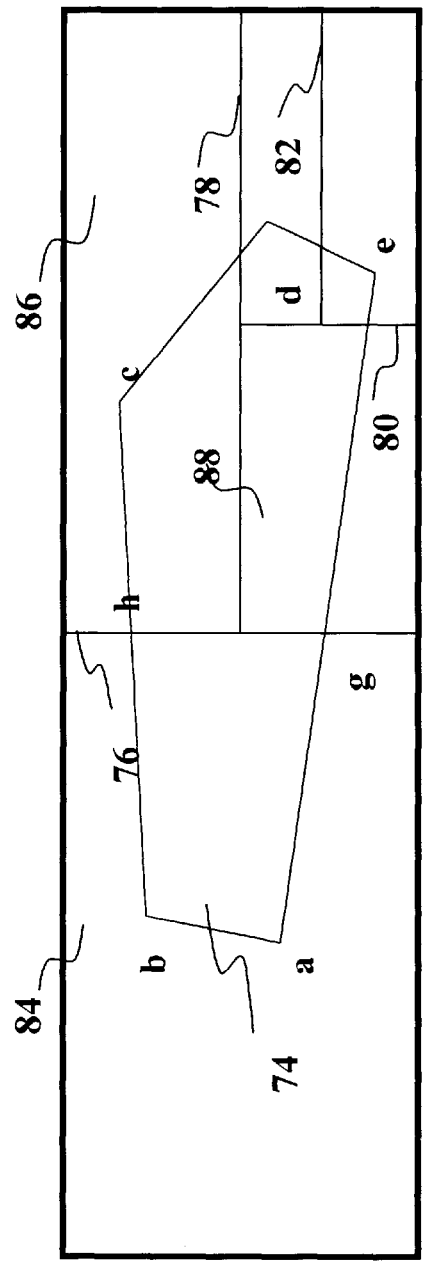
FIG. 7B illustrates a rectangle having a projection of surface in accordance with the teachings presented herein.

Reference is now made to FIG. 7B, which demonstrates the initial rectangle with projection 74 of surface on it. Division lines 76, 78, 80, 82 are drawn according the method described above. Division line 76 subdivides initial rectangle into equal rectangles 84 and 86. Initial rectangle is minimal for segments bc, ea. Division line 76 for this rectangle intersects with segments bc, ea. Accordingly, segment ge belongs to minimal rectangle 88 resulting from subdivision of the minimal rectangle 86.

Information relating to surfaces distributed along the perimeter/sides of an initial rectangular area or along a division line are determined and preferably stored in dynamic data structures. What follows are definitions of the data structures that may be used for storing this information.

Array 250

Figure 19:
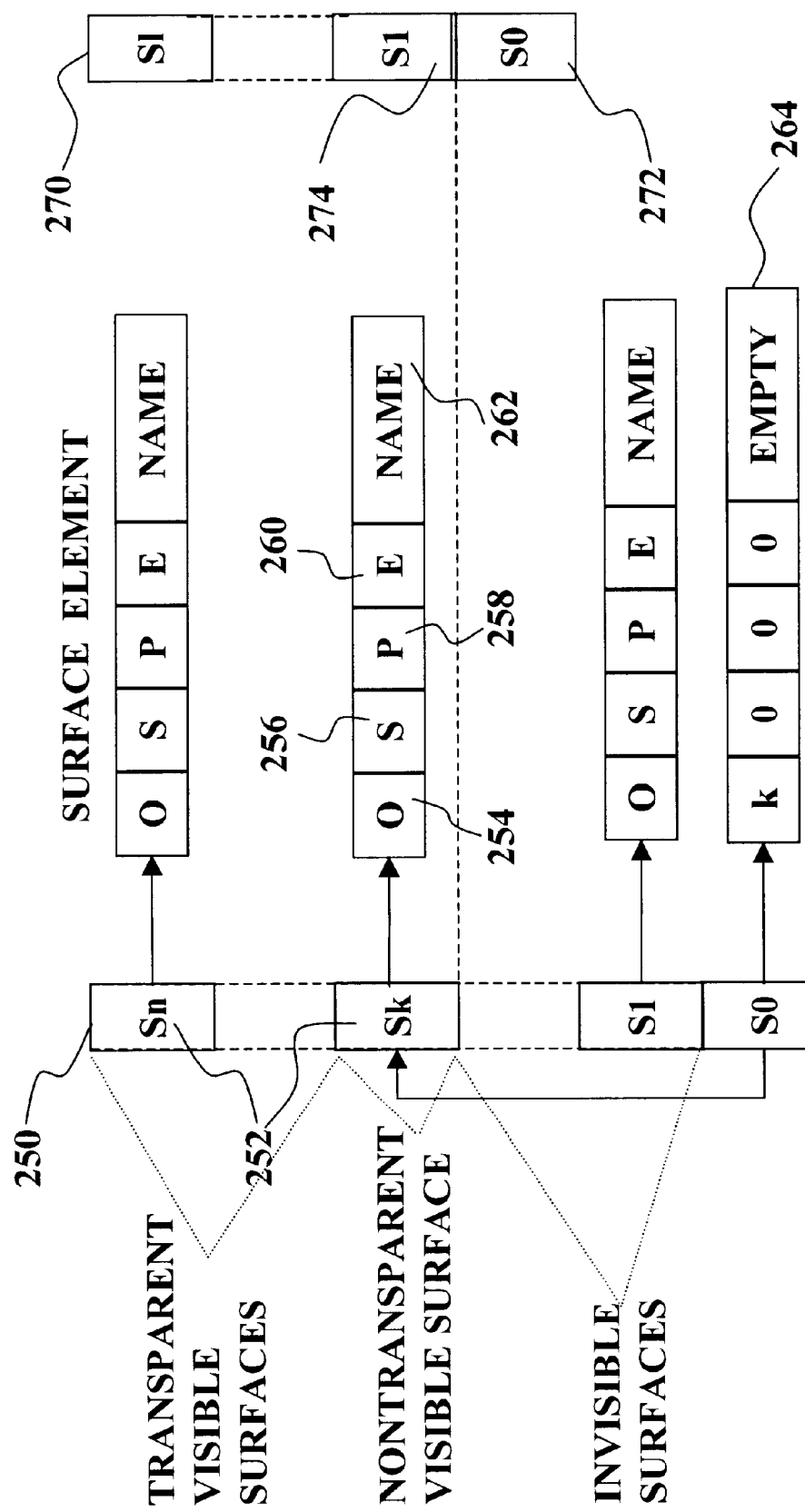
FIG. 19 illustrates an exemplary array data structure of all surfaces in accordance with the teachings presented herein.

FIG. 19 is an example of an array data structure 250 (further called "array of all surfaces") suitable for storing all surfaces distributed over a point on an initial rectangular area or a division line. As shown, surfaces are grouped together according to type, that is, whether the surface is visible and transparent visible and opaque, or hidden, and stored in consecutive array entries.

Furthermore, an array element of array 250 includes five fields, namely, an object field 254, which references the object in array of objects 160; a surface field for storing the associated surface(s) 256 of the object stored in the object field 254; a polygon field 258 for storing the associated polygon(s) of the surface stored in the surface field; an edge field for storing the edge(s) 260 belonging to the polygon(s) stored in the polygon field; and a subdivision name field 262 for storing the name of subdivision, which was divided by the current division line.

The first element 264 of array 250 is a header field which holds the index of the k-th element of the array. The first visible opaque surface encountered is stored in entry number k of the array 250. All visible transparent surfaces are stored in array elements having indices greater than k. All hidden surfaces are stored in array elements having an indices lesser than k. If there is no opaque surfaces over the point of interest then k is equal to one and the second element (with index equal one) of the array 250 is empty.

Array 270

All visible surfaces along a division line of along a perimeter of an initial area subdivision may be determined from the array 250 of all surfaces. Recall that only those surfaces stored as an element of array 250 having an index greater than or equal to k are visible. Hence, a dynamic array 270 of visible surfaces is easily constructed from array 250 of all surfaces. Each element in array 270 of visible surfaces have the same structure as in array 250. Therefore, all array elements in array 250 having an index greater than or equal to k are copied into the array 270 of visible surfaces. The first element 272 (element with index zero) of array 270 of visible surfaces contains information about the projected visible surface boundary edge that intersects with one side of rectangular subdivision. If present, the second element 274 (that is, the array element having the index one) of the array 270 of visible surfaces contains information about the first encountered visible opaque surface. Otherwise, this array element is empty.

Array 270 of visible surfaces is constructed during the process of determining the points of intersection of visible surface boundary edges and a division line.

Array 280

For each division line or side of a rectangular area, the points of intersection of a visible surface boundary edge and the division line or side of a rectangular (point(s) of intersection) are collected and ordered in an array, namely an array of intersections 280. These arrays are constructed for each division line.

FIG. 20 illustrates an array 280. As shown each array element of the array 280 comprises two fields: a coordinate field which stores either the x or y coordinate of the referenced point of intersection (i.e. the x coordinate for horizontal division lines/sides, here, division lines/sides bc and ad, and the y coordinate for vertical division lines/sides, here division lines ab and cd ); and a visible surface field which references the array 270 (FIG. 19) of visible surfaces. The surfaces referenced in the array 270 are visible along division lines, which form the subdivision, starting from a current visible point of intersection in the right or top directions until the next visible point of intersection.

Array 280 is sorted in ascending order according to the x or y coordinates of points of intersection. The first element of the array 280 contains the coordinate of the left (bottom) point of the division line/side. The first array element of array 270 of visible surfaces corresponding to this point is set to empty.

Figure 21B:
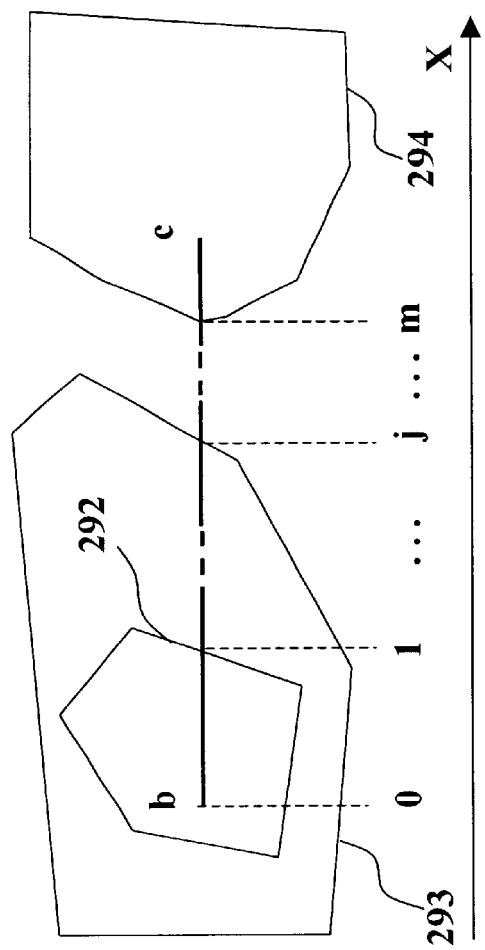
FIG. 21B illustrates a side of the subdivision of FIG. 21A being intersected by projected surface boundary edges in accordance with the teachings presented herein.
Figure 21A:
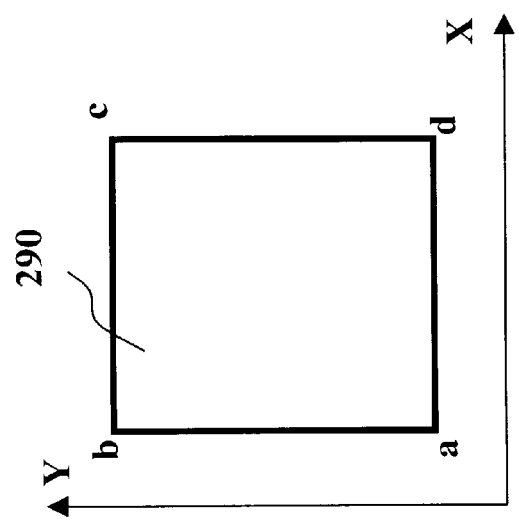
FIG. 21A illustrates an arbitrary rectangular subdivision in accordance with the teachings presented herein.

To further illustrate the forgoing discussion, reference is made to FIG. 21A, which shows a rectangular subdivision abcd and to FIG. 21B, which depicts a division line bc which corresponds to side bc of the subdivision in FIG. 21A, said division line being intersected by projected surface boundary edges 292, 293 and 294. The projected surface boundary edges 292, 293 and 294 intersects division line bc at points 1, j, and m. Therefore, array 280 constructed for side/division line bc would include the aforementioned information corresponding to these points of intersection.

Array 290

What follows are several techniques, either alone or any combination thereof, which reduces the number of necessary computations thereby further increasing efficiency of the present solution.

Each rectangular area and/or subdivision may have a list of potentially visible surfaces associated therewith. "Potentially visible surfaces" are surfaces, which are at least partially projected inside a given subdivision. Thus, for each array 270 constructed, the second array element in the array will reference the same surface.

There are several ways to generate this list, including the following:

1) Determine those projected surfaces whose boundaries intersect with a division line/perimeter of a subdivision (that is, a surface, which is partially projected inside a subdivision) and those surfaces, which are completely projected inside a subdivision are considered potentially visible surfaces. Hence, inspection of only potentially visible surfaces and determining points of intersection of boundaries of their projections with division line inside subdivision must be made.

Figure 8:
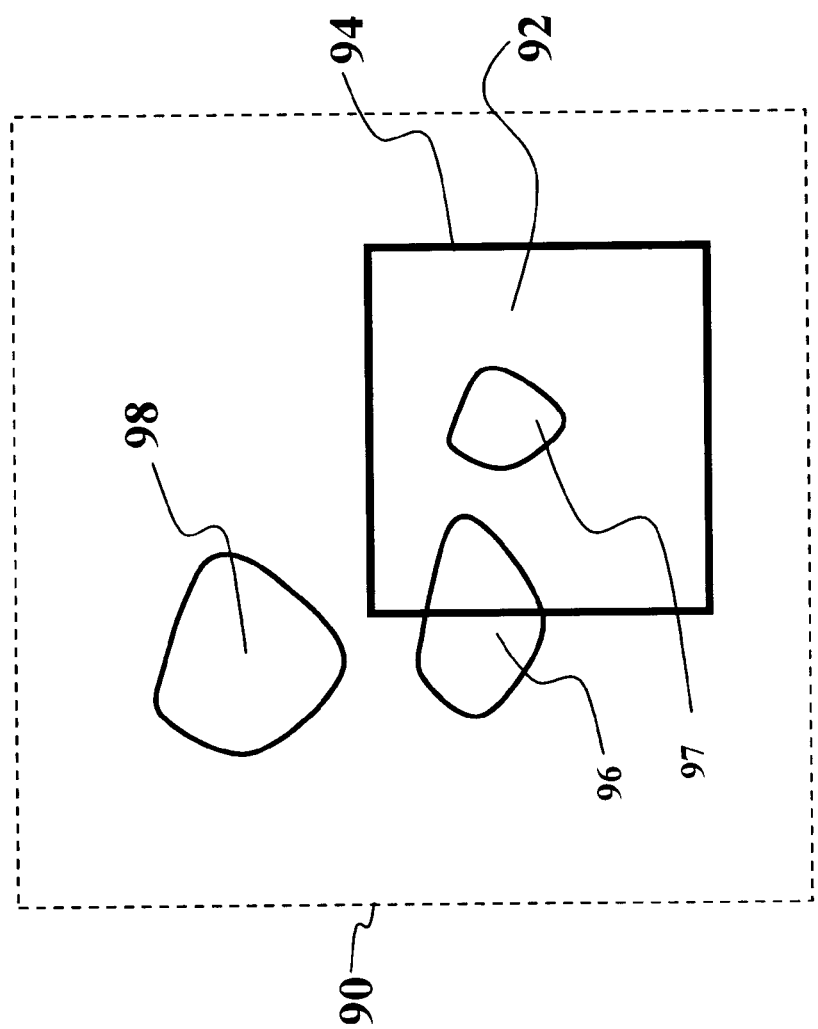
FIG. 8 illustrates a view plane having a subdivision and projections of potentially visible surfaces in accordance with the teachings presented herein.

To illustrate this technique, reference is now made to FIG. 8. As shown, view plane 90 includes an arbitrary subdivision 92 bounded by its perimeter 94. For subdivision 92, only projected surfaces 96 and 97, which are projected partially or entirely inside subdivision 92, are considered potentially visible. Surface projection 98, which is located outside subdivision 92, is not visible inside subdivision 92. Therefore, surface projection 98 is not a potentially visible surface for subdivision 92.

Therefore, in the forgoing example, surfaces 96 and 97 will be preferably stored in a an array data structure constructed for subdivision 92, i.e. an array 290 of potentially visible surfaces for the subdivision.

2) Determine an opaque surface, which is projected on a view plane having a subdivision located entirely inside its boundaries. This surface and all other surfaces which are at least partially projected inside the subdivision and which lie on one side of the opaque surface in the direction of projection, are considered potentially visible surfaces for the subdivision.

Figure 9A:
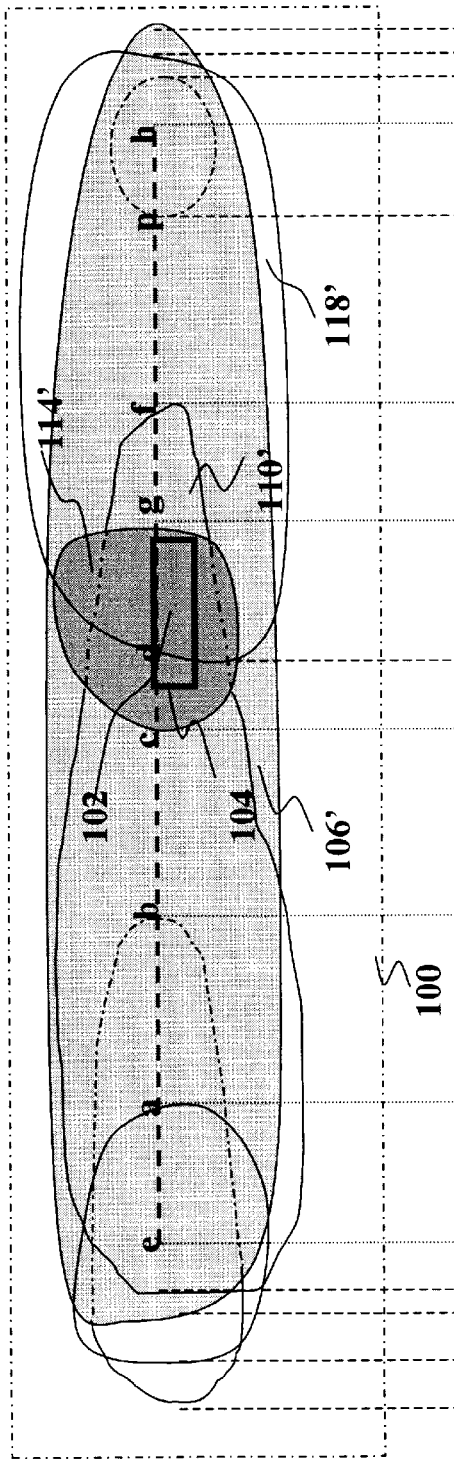
FIG. 9A illustrates a view plane with a subdivision and projections of surfaces in accordance with the teachings presented herein.
Figure 9B:
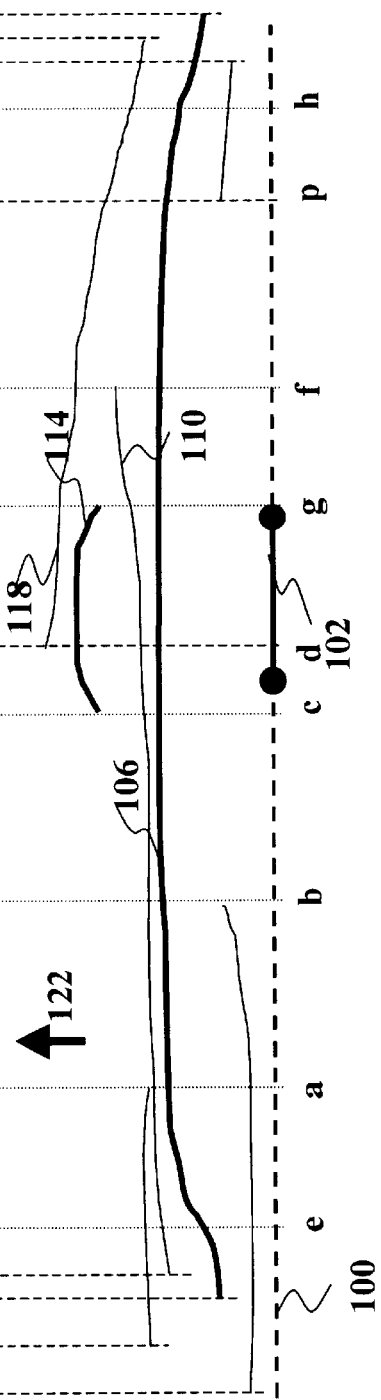
FIG. 9B illustrates a cross sectional of FIG. 9A in accordance with the teachings presented herein.

To illustrate this point, reference is made to FIGS. 9A and 9B. As shown in both Figures, view plane 110 includes an arbitrary subdivision 102 being bounded by its perimeter 104 and having several surfaces projections thereon. FIG. 9A is a top plan view of view plane 100. FIG. 9B is a cross sectional view of FIG. 9A.

Arrow 122 denotes the direction of projection. Opaque surface 106 is projected on the view plane 100. The subdivision 102 is located entirely inside surface 106 projection 106'. Surfaces 110, 114 and 118 are located on one side of surface 106 in the direction of projection 122 and are partially projected in subdivision 102. Hence, projected surfaces 106, 110, 114 and 118 are considered as potentially visible for subdivision 102 in accordance with the present invention.

Therefore, surfaces 106, 114 and 118 will be preferably stored in an array structure constructed for subdivision 102, i.e. an array 290 of potentially visible surfaces for the subdivision.

3) Determine an opaque surface, which is projected on a view plane having a subdivision located entirely inside its boundaries and this opaque surface is the first opaque surface that is visible along the entire perimeter of the subdivision. This surface and all other surfaces which are at least partially projected inside the subdivision and which lie on one side of the opaque surface in the direction of projection, are considered potentially visible surfaces for the subdivision.

To illustrate this point, reference is again made to FIGS. 9A and 9B. Opaque surface 114 is projected on the view plane 100. Subdivision 102 is located entirely inside surface's 114 projection 114'. Surface 114 is visible along the entire perimeter 104 of subdivision 102. Hence, projected surfaces 114 and 118 are considered as potentially visible for subdivision 102 in accordance with the present invention. However, projected surfaces 106 and 110, each of which are obscured by opaque surface 114, are not considered potentially visible for subdivision 102 in accordance with the present invention.

Therefore, surfaces 114 and 118 will be preferably stored in an array data structure constructed for subdivision 102, i.e., an array 290 of potentially visible surfaces for the subdivision.

Array 250 of all surfaces, array 270 of visible surfaces, array 280 of intersections and/or array 290 of potentially visible surfaces for a subdivision are populated while traversing a division line.

Stack

The method of the present invention is recursive. Therefore it uses a stack to store the above data structures, namely arrays 250, 270, 280 and/or 290 for subsequent processing. Each stack element corresponds to a rectangular subdivision. Moreover, additional data structures that may be used include a data structure for storing the name of the rectangular subdivision and a data structure for storing information as to whether an opaque surface covers the rectangular subdivision.

Figure 22B:
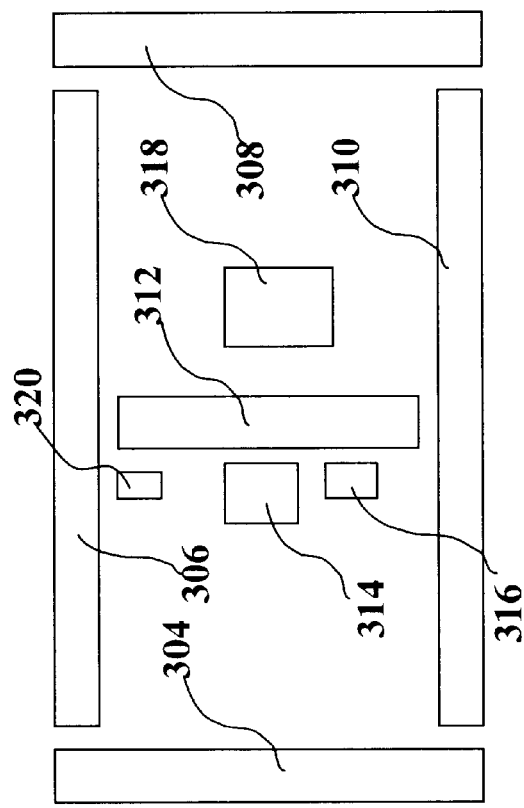
FIG. 22B illustrates exemplary intermediate data structures, each of which are stored in a stack element corresponding to subdivision in FIG. 22A in accordance with the teachings presented herein.
Figure 22A:
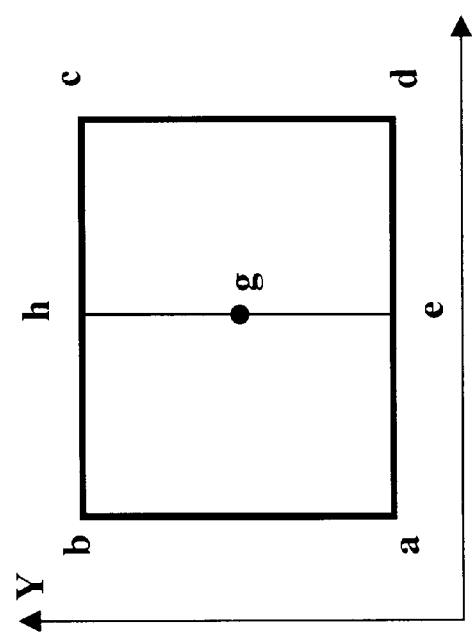
FIG. 22A illustrates an arbitrary rectangular subdivision in accordance with the teachings presented herein.

Reference is now made to FIGS. 22A and 22B. FIG. 22A demonstrates an arbitrary rectangular subdivision abed 300 with a division line eh 302. The data structures, which are stored in the stack element corresponding to subdivision 300, are schematically illustrated in FIG. 22B.

That is, data structures 304, 306, 308 and 310 are arrays 280 of intersections for the left, top, right and bottom sides of the subdivision. Data structure 312 is an array 280 of intersections for division line eh. Data structure 314 is an array 250 of all surfaces for the middle point g of division line eh of rectangle abcd 300. Data structure 316 is the name of rectangle abcd 300. Data structure 318 is an array 290 of potentially visible surfaces for rectangle abcd 300. If rectangular subdivision is positioned entirely inside a projection of opaque surface then data structure 320 corresponds to this opaque surface, otherwise it is empty.

What now follows is a description of the various routines, which are used in the present solution to determine surface visibility.

Figure 23:
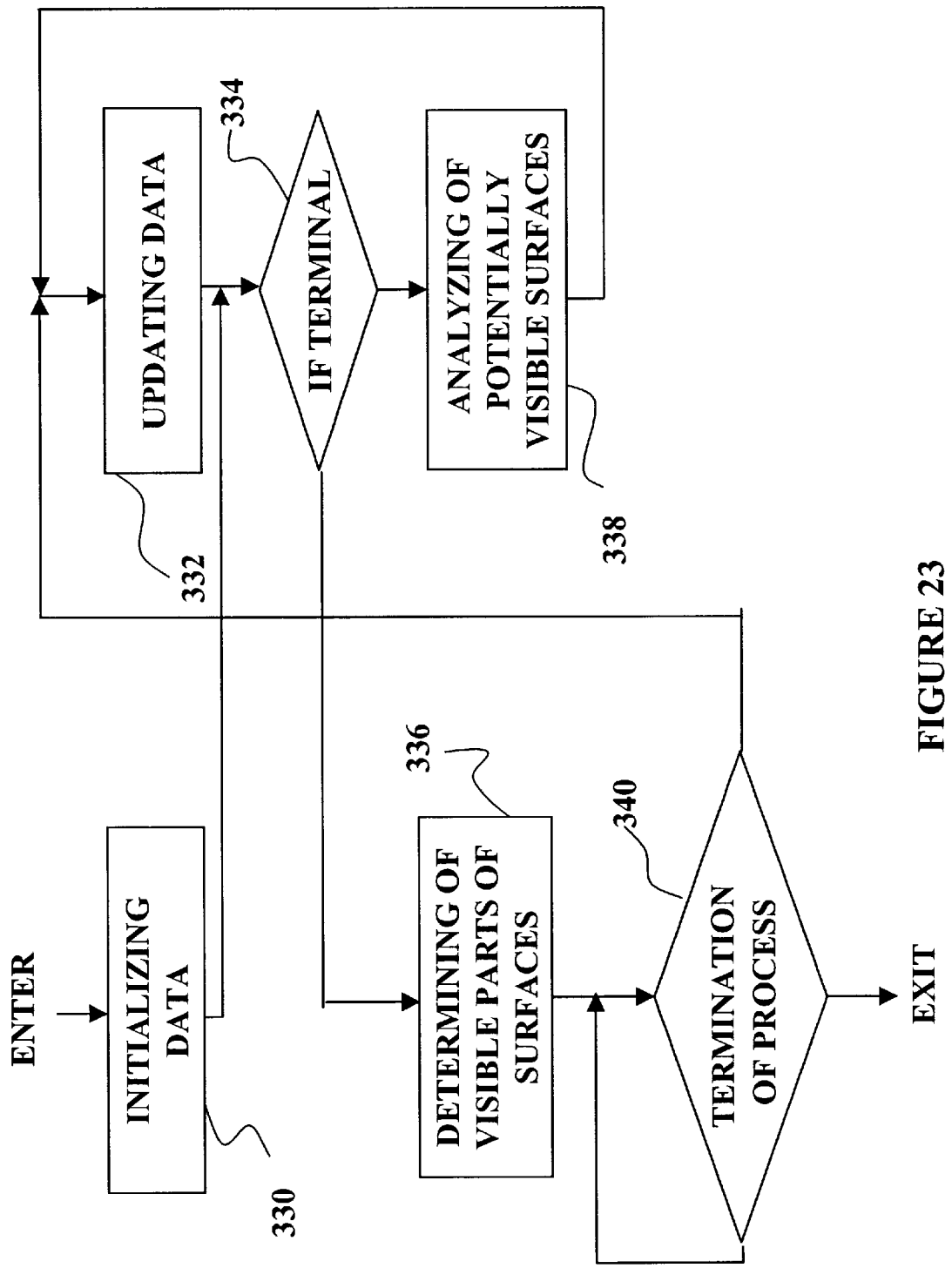
FIG. 23 illustrates a schematic block diagram of one method of present invention in accordance with the teachings presented herein.
Figure 24:
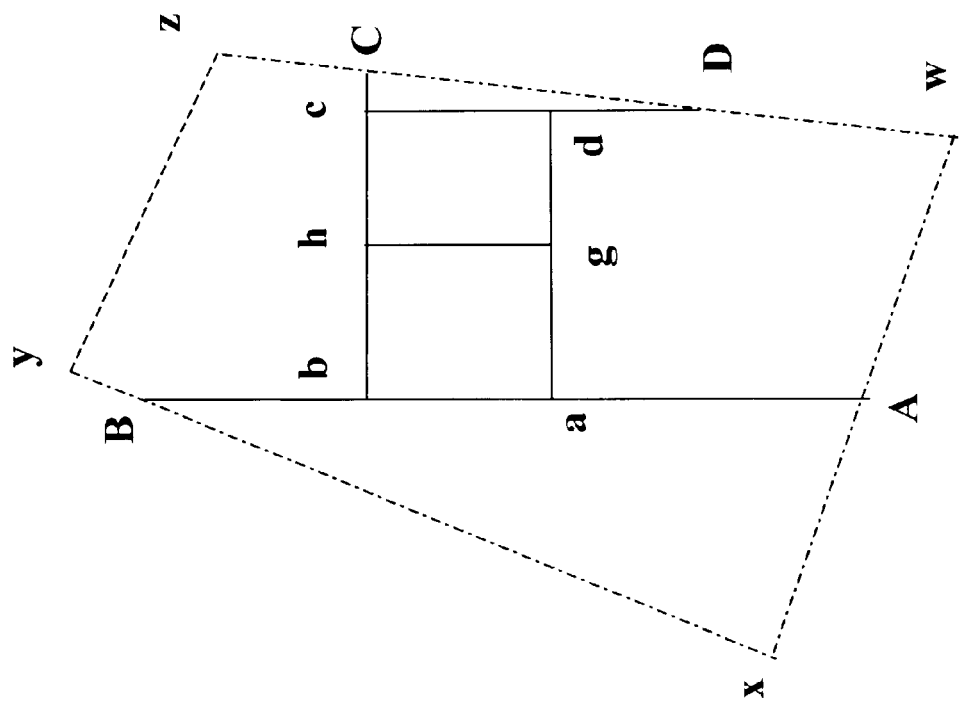
FIG. 24 illustrates a region of projection of scene on a view plane in accordance with the teachings presented herein.

FIG. 23 depicts a block diagram of a method for determining parts of visible surfaces on a view plane, operative in accordance with a preferred embodiment of the present invention. What follows are descriptions of two separate processes. First, is the process for determining the distribution of surfaces along the division lines, which constitute the perimeter/sides of an initial rectangular area corresponding to a display screen. Next, is the process for determining the distribution of surfaces along an arbitrary division line Determining Distribution of Surfaces on the Boundaries of an Initial Rectangular Area Display Screen Reference is made to FIG. 24. FIG. 24 demonstrates an arbitrary region wxyz on a view plane. Initial rectangular area abcd corresponds to the display screen. The scene is projected entirely inside the region wxyz. The boundary edges of surfaces of three-dimensional objects representing the scene are projected on a view plane.

First, part of the scene data is chosen, which is projected inside the initial rectangular area abcd. Arrays 280 (FIG. 20) of intersections is determined on the boundary lines of the initial rectangular area abcd. Arrays of visible surfaces 270 (FIG. 19) referenced in arrays 280 of intersections will determined in visible points of intersection of projections of boundary edges of surfaces with boundary lines of the initial rectangular area. Intermediate data structures are initialized.

In FIG. 24, the distribution of all surfaces is predetermined in point A. Point A may be chosen arbitrarily. For example, point A may be a point in "infinity" where there are no surfaces at all. Point A is a boundary point and all distributions of surfaces along the boundaries of subdivisions are calculated from the initial distribution of surfaces in point A.

The projection of the scene is subdivided by straight division lines, which make up the perimeter of the initial rectangular region abcd. The first division line AB is an infinite line passing through the corner points a and b of rectangle abcd. The second division line bC and the third division line cD are rays starting from points b and c respectively. The last division line is a segment da.

Initially, the distribution of surfaces along the division line AB is determined. All projected surface boundary edges are traversed. During the traverse, the array of all minimal rectangles for surface boundary edges and the array of all minimal rectangles for surfaces are formed.

Division line AB divides all edges of the scene into three different sets. The first set is the set of projected surface boundary edges, which are located entirely inside subdivision AxB. The second set is the set of projected surface boundary edges, which are located entirely inside subdivision ByzwA. The third set is the set of projected surface boundary edges, which intersect division line AB.

On the view plane, all intersections of division line AB with and projected surface boundary edges are determined according to conventional techniques. Moreover, all pairs of sub surface boundary edges resulting from the dissection of the surface boundary edges by division line AB are added to an array of all minimal rectangles for surface boundary edges.

All points of intersection are sorted according to their y intersection values. The method of sorting can be either quicksort or bubble sort or any other known sorting method.

All division lines are traversed and the distribution of surfaces determined.

Division line AB is traversed from point A successively from one point of intersection to another and distribution of visible surfaces is determined in each point of intersection.

The procedure for determining the distribution of surfaces along the perimeter of the initial rectangular region is general for the present invention and will be described in the following section. Namely, the various arrays, that is the array of visible surfaces 270 and the arrays 280 (FIG. 20) of intersections for segment Ab of division line AB, division lines bC, cD, and da;. and arrays 250 (FIG. 19) of all surfaces in point b, c and d are, determined in the same manner as that of processing of a division line.

What follows is a description of an exemplary technique for determining the distribution of visible surfaces along a division line.

Determining Distribution of Surfaces along a Division Line

For a current subdivision that is to be divided by a division line, all projected surface boundary edges for which the subdivision is minimal, is determined by accessing the array of all minimal rectangles for surface boundary edges. As previously described above, the entry point in the array of minimal rectangles for surface boundary edges corresponds to the name of the current subdivision. Only those surface boundary edges intersect with division line of current subdivision.

On a view plane, points of intersection of division line with projections of edges are calculated. The method of calculating of point of intersection of two lines on a plane is well known.

The division line is parallel either to x or y-axis. Points of intersection are sorted according to their x or y values. The method of sorting can be either quicksort or bubble sort or any other known method.

In parallel, the pairs of new edges resulting from dissection of edges by division line are added to the dynamic array of all minimal rectangles for surface edges as was described above.

The division line is traversed from one point of intersection to another and the distribution of surfaces in each point of intersection is determined.

Determining of Distribution of Surfaces in Points of Intersection

An exemplary technique for determining the distribution of surfaces in points of intersection will now be described.

While traversing a division line, projected surfaces can appear or disappear only in those points of division line where the projected surface boundary edges intersect with the division line. Herein, all projected surface boundary edges of appearing surfaces are defined as appearing edges and all projected surface boundary edges of disappearing surfaces are defined as disappearing edges.

To illustrate this point, reference is made to FIGS. 9A and 9B wherein line eh is a division line. Division line eh is traversed from point e to point h. As a result, all projected surface boundary edges intersecting with division line eh in intersection points, b, g and f are appearing edges in the direction of traverse. Furthermore, all projected surface boundary edges intersecting with division line eh in intersection points c, d and p are disappearing edges, in the direction of traverse.

Figure 25:
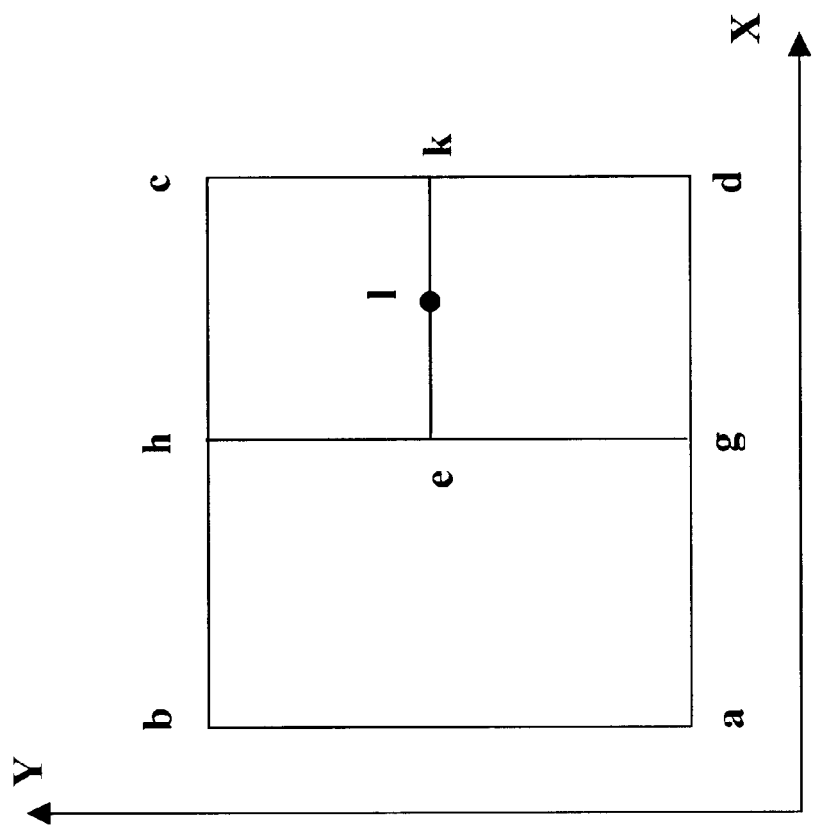
FIG. 25 illustrates a subdivision of a view plane in accordance with the teachings presented herein.
Figure 27:
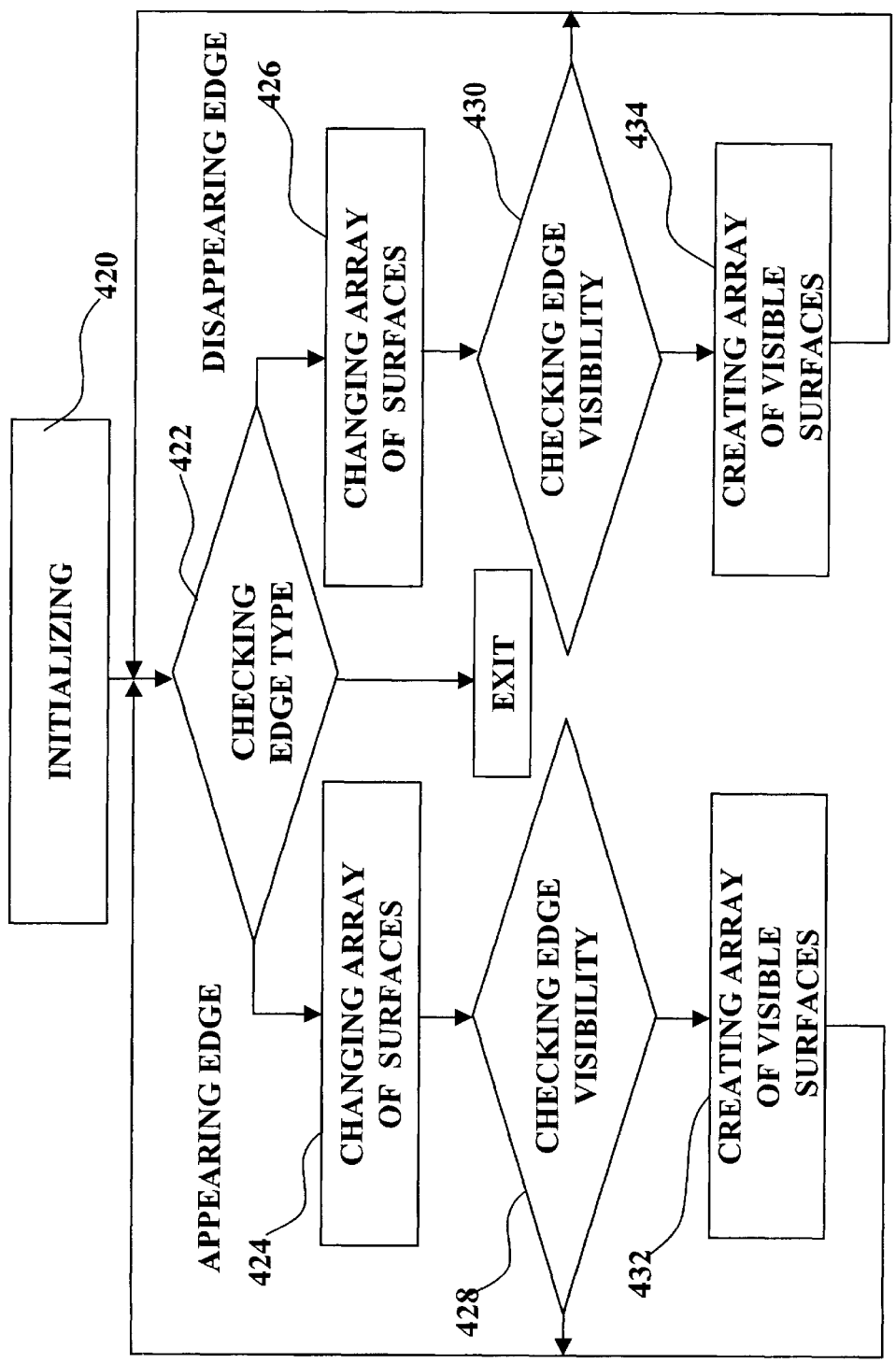
FIG. 27 illustrates a block diagram of an exemplary method for processing a division line in accordance with the teachings presented herein.

Both FIGS. 25 and 27 will be used to describe in detail the procedure for processing a division line to determine the distribution of surfaces in the points of intersection in accordance with the present solution. FIG. 27 illustrates a block diagram of a procedure for processing a division line to determine the distribution of surfaces in a point of intersection in accordance with the present solution. FIG. 25 illustrates an arbitrary subdivision ghcd with division line ek. Point 1 is a middle point of division line ek.

Before line ek is divided, division line hg was traversed and the various arrays, 270, 270, 280, arrays of potentially visible surfaces, etc. are established. Thus, array 250 of all surfaces in point which is along division line hg is known before line ek is divided. Array 250 of all surfaces in point e is preferably copied to a temporary variable or data structure (stack), also known herein as the current array of all surfaces in point e. Further processing will be done using this copy. The array of potentially visible surfaces for subdivision ghcd is stored in field 318 of the current stack element.

In block 420 the current array of all surfaces in point e and the array of potentially visible surfaces for subdivision ghcd are compared and all surfaces, which are not common to both arrays, are deleted from the current array of all surfaces in point. The surface which, is stored in field 320 of current stack element, is also present as an element in the current array of all surfaces. The deleted surfaces are obscured by opaque surface from field 320 and therefore are not taken into account.

Array 280 of intersections is constructed for division line ek of processed subdivision ghcd. Initially, the array 280 has only one element. This element contains the coordinate of starting boundary point of division line and array 270 of visible surfaces in this point. Array 270 of visible surfaces is constructed from current array of all surfaces by copying only visible surfaces. The first element of array 270 of visible surfaces is empty. The second element contains visible opaque surface and all other elements contain visible transparent surfaces.

Boundary edges intersecting with the division line ek are taken from array of all minimal rectangles for surface boundary edges as was described above. Index in array of all rectangles for edges is determined from the name of subdivision ghcd.

Among the surface boundary edges intersecting with division line ek only surface boundary edges, which satisfy either one of the following conditions, are considered:

1. Surface boundary edges belonging to those surfaces in the array of potentially visible surfaces, which is stored in field 318 of current stack element. The array of potentially visible surfaces, which is stored in field 318 of the current stack element and contains only those surfaces, which are visible along the perimeter of subdivision ghcd.
2. Surface boundary edges belonging to surfaces, which are projected entirely inside subdivision ghcd and not obscured by the opaque surface that is stored in field 320 of current stack element.

The coordinates of the points of intersection of these surface boundary edges with the division line are determined. For vertical a division line, the y coordinate is determined. For a horizontal division line, the x coordinate is determined. Herein, surface boundary edges are sorted in ascending order based on the x or y value of their respective point of intersection.

Next, the points of intersection are traversed in successive order. Both directions of traverse, that is, from the edge with the maximal intersection coordinate to edge with the minimal coordinate and vice versa, are possible. The first direction of traverse from maximal to minimal coordinate is utilized for left and bottom subdivisions. The second direction of traverse from minimal to maximal coordinate is utilized for right and top subdivisions. For example, in FIG. 25 the division line ek is positioned on the right. Therefore, ordered edges are traversed from the edge with the minimal x coordinate to the edge with the maximal x coordinate (i.e. from point e to point k).

Edge traversal begins in block 422. During edge traversal, a number of check operations is executed for each traversed edge.

The first check operation is a check for traverse of the middle point of the division line. If the x coordinate (y coordinate) of the current point of intersection is greater (lesser) than the x coordinate (y coordinate) of the middle point of division line or if there is no points of intersection at all, then the current array of all surfaces is stored in field 314 of the current stack element for use in the following dissections.

The next check operation is a check for whether all the edges have been traversed. If true, the procedure terminates.

The next check operation determines if a surface appears or disappears for the current edge in the direction of traverse. If the current edge is an appearing edge then control is transferred to block 424. If the current edge is a disappearing edge then control is transferred to block 426.

Appearing Edges

All modifications and/or updates to the current array of all surfaces for surfaces having appearing boundary edges are determined in block 424.

If the current appearing edge belongs to a surface, which is obscured by a visible opaque surface then this surface is inserted into the current array of all surfaces. The index of the inserted surface in the current array of all surfaces is less than the index of the visible opaque surface in array.

To illustrate this point, reference is made to FIGS. 9A and 9B, wherein the boundary surface edge belonging to a surface 180 in point p is obscured by the visible opaque surface 106. Hence, surface 180 is inserted in the current array of all surfaces.

If the current appearing edge belongs to a transparent surface, which is not obscured by a visible opaque surface then this transparent surface is inserted into the current array of all surfaces. The index of the inserted surface in the current array of all surfaces is greater than the index of the visible opaque surface in array.

In FIGS. 9A and 9B the surface boundary edge belonging to transparent surface 118 in point d is not obscured by visible opaque surface 114. Hence, transparent surface 118 is inserted in the current array of all surfaces.

If the current appearing edge belongs to an opaque surface, which obscures a previous visible opaque surface then this opaque surface is inserted into the current array of all surfaces. In this case, the indices of visible transparent surfaces in array of all surfaces are greater than the index of the inserted surface. The indices of the rest of the surfaces are less than the index of the inserted surface.

Relative order of surfaces in the direction of projection is determined by the procedure of comparing of surfaces, which will be described herein below. Then control is transferred to block 428.

The visibility of an appearing edge is checked in block 428. If the current appearing edge is hidden, an array 270 of visible surfaces for the current point of intersection will not be created. Control is transferred to block 422. On the other hand, if the current appearing edge is visible, control is transferred to block 432.

At block 432, an array 270 of visible surfaces for the current appearing edge is created. All visible surfaces, which are stored in the current array of all surfaces are copied into the array 270. The current appearing edge is stored as the first element of this array 270. The coordinates of the point of intersection of the current appearing edge with the division line is stored in the array 280 of intersections for division line. The array 270 of visible surfaces is also stored in the array 280. Afterwards, control is transferred to block 422.

The process continues for the next appearing edge in sequence.

Disappearing Edges

All modifications and/or updates to the current array of all surfaces for surfaces having disappearing boundary edges are determined in block 426.

If a current disappearing edge does not belong to a visible opaque surface, then this surface is deleted from the current array of all surfaces. This situation is demonstrated in FIGS. 9A and 9B in points, b and f. Moreover, if a current disappearing edge belongs to a visible opaque surface, then this surface is also deleted.

After that, visible opaque surface is searched for in the current array of all surfaces. The indices of visible transparent surfaces are rearranged so that they become greater than index of the found visible opaque surface. The indices of the rest of the surfaces are less than the index of the found visible opaque surface. This situation is demonstrated in FIGS. 9A and 9B, where the edge in point g belongs to opaque surface 114. The relative order of the surfaces in the direction of projection is determined by the procedure of comparing of surfaces, described below. Then control is transferred to block 430.

The visibility of a disappearing edge is checked in block 430. If the current disappearing edge is hidden, an array 270 of visible surfaces for the current point of intersection will not be created. Control is transferred to block 422. On the other hand, if the current disappearing edge is visible, control is transferred to block 434.

At block 434, an array 270 of visible surfaces for the current disappearing edge is created. All visible surfaces stored in the current array of all surfaces are copied into the array 270. The current disappearing edge is stored as the first element of this array 270. The coordinates of the point of intersection of the current disappearing edge with the division line is stored in the array 280 of intersections for division line. The array 270 of visible surfaces is also stored in the array 280. Afterwards, control is transferred to block 422.

The process continues for the next disappearing edge in sequence.

The forgoing procedure describes division lines positioned in right (top) subdivisions having a predetermined direction of traverse of intersection points. For left (bottom) subdivisions, the direction of traverse of intersection points is reversed Procedure of Comparing and Ordering Surfaces The procedure of comparing surfaces determines the order of surfaces intersecting with a projection ray starting from a point of a view plane. In order to accomplish this task, the z coordinates of points of intersection of surfaces with projection ray are determined. The task of determining coordinates (x, y, z) of points of intersection of surfaces with a straight line in three dimensions is well known in the art. If the surface is comprised of flat polygons this task is reduced to a solution of a system of three linear equations. This is also well known in the art.

The procedure presented herein has general applicability. It can be utilized for arbitrary surfaces. Herein, it will be described for the surfaces approximated as flat polygons.

Figure 28:
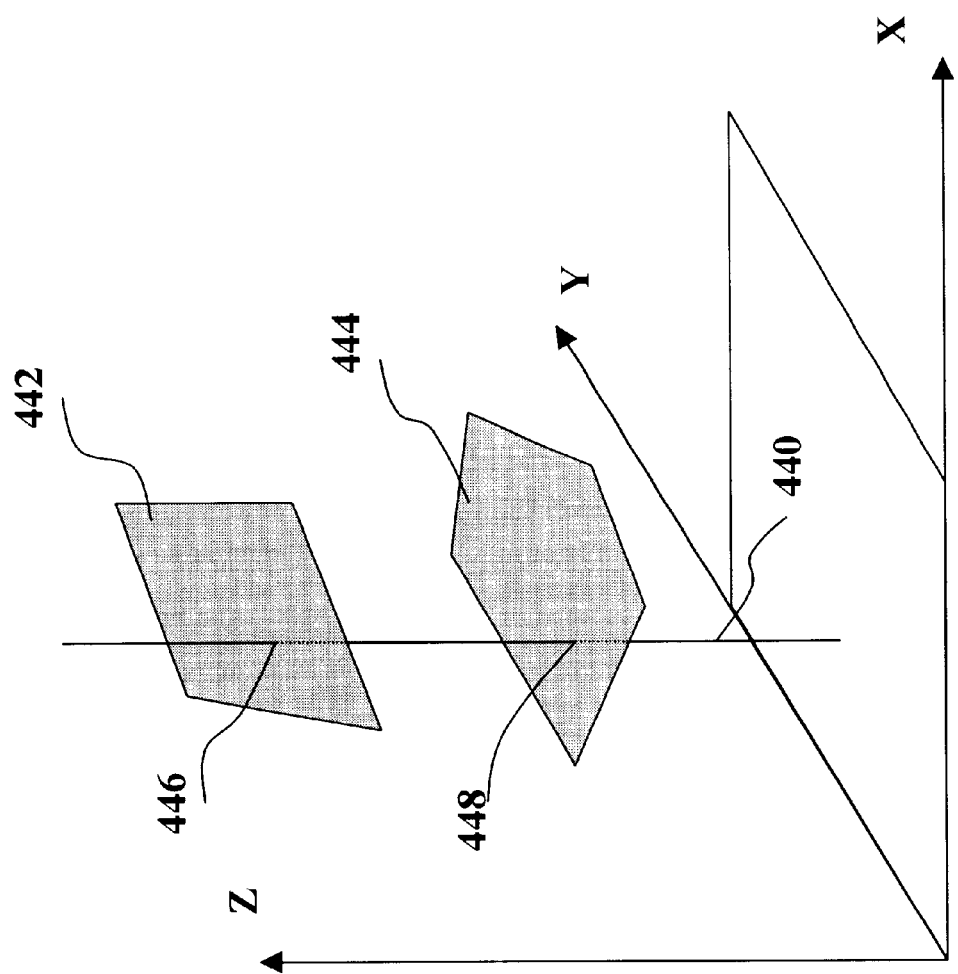
FIG. 28 illustrates a projection ray having several intersections with a plurality of flat polygon faces in accordance with the teachings presented herein.

Reference is made to FIG. 28, which demonstrates the intersection of a projection ray 440 with flat polygon faces 442, 444 of three-dimensional surfaces. The points of intersection 446 and 448 are determined from the equation of planes to which polygons belong and two equations for straight line 440.

In the present invention, in order to determine the point of intersection of a ray with a surface, the polygon projected on to the fixed point on a view plane must be determined. The equation of the plane for this polygon is easily determined from the coordinates of its vertices.

In arrays 270 of visible surfaces and 250 of all surfaces, the surfaces are represented by a boundary edges together with information about the polygon(s) to which this edge belongs and the name of subdivision in which this edge first appeared (FIG. 19). The name of the subdivision uniquely determines the division line inside the subdivision and also the point of intersection of the edge projection with this division line. For this point of intersection, it is possible to determine the polygon projected onto this point. For an arbitrary point on a view plane located inside the projection of surface, the polygon of this surface projecting onto the point is determined using the boundary edge of the surface. Traversing the line from boundary point to this point and determining projections of polygons, which intersect with line of traverse, accomplishes this task.

During this traverse the neighboring polygons array for surface is utilized. The vertices of polygons which are traversed by the line of traverse must be transformed to a unit cube coordinates. Those vertices are the only vertices, which must be transformed in addition to vertices corresponding to boundary edges of surfaces.

Figure 29:
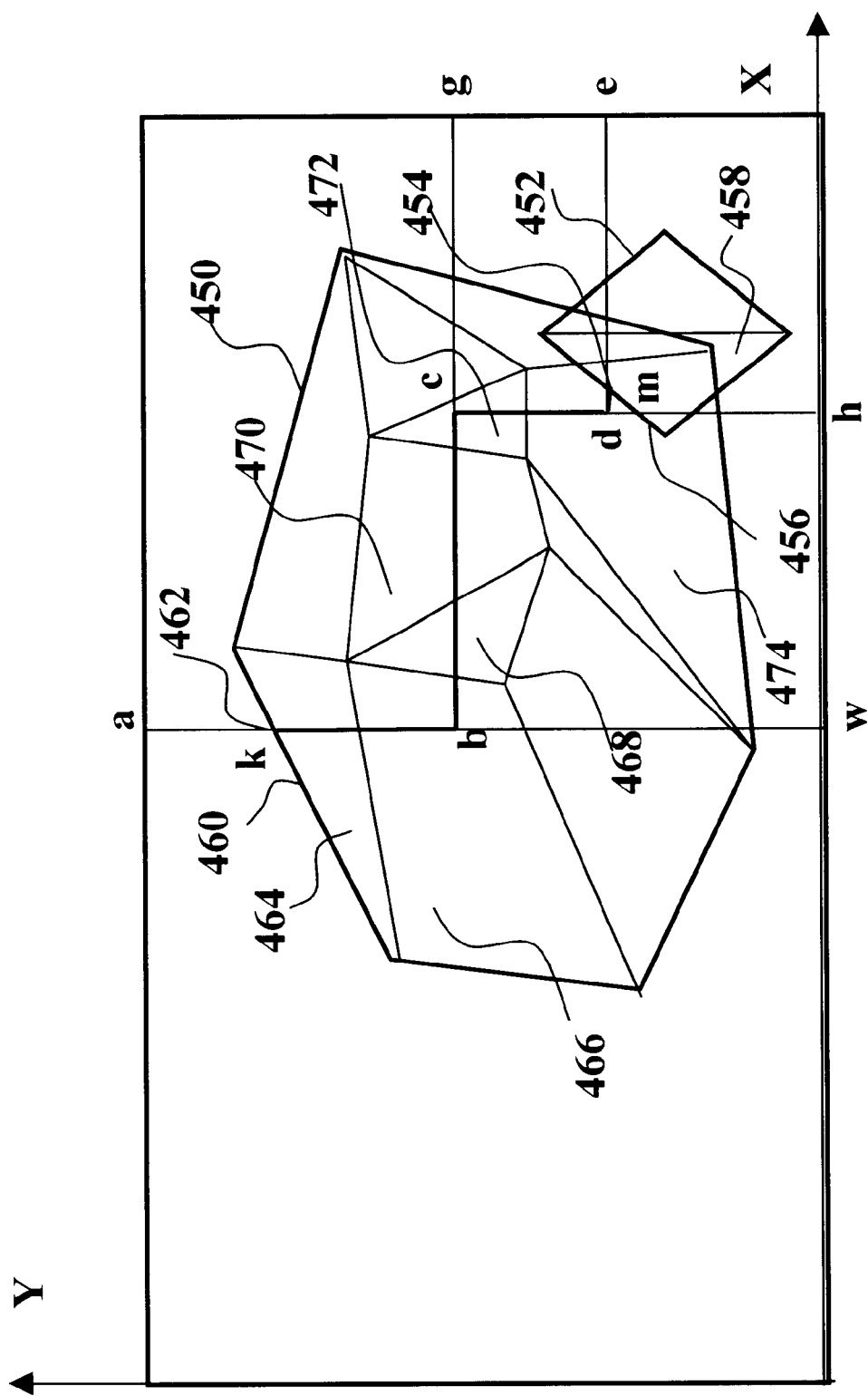
FIG. 29 illustrates surface projections on a view plane in accordance with the teachings presented herein.

Reference is now made to FIG. 29. FIG. 29 demonstrates the projections 450 and 452 of two surfaces on a view plane.

The order of these surfaces in z direction must be determined in point m 454. Point m belongs to the projection 456 of boundary edge of projection 452. The boundary polygon of this surface with projection 458 is determined from array 270 of visible surfaces or array 250 of all surfaces. The coordinate z for this surface in point is easily determined. Coordinate z of surface with projection 450 in point m, can be determined from polygon projected onto the point m. The boundary edge with projection 460 intersecting with division line aw in point k 462 is known for this surface. The polygon with projection 464, to which this edge belongs, is also known. Traverse from boundary point k to point m is executed along the line km through the set of segments kb, bc, cd, dm of division lines. The line km intersects in turn with projections of polygons 464, 466, 468, 470, 472 and 474. Each next polygon in this chain has a common edge with a previous polygon. Therefore, each next polygon can be determined from a previous polygon. Likewise, coordinate z in point 454 for polygon with projection 474 is determined according to the forgoing method.

Determining Visible Surfaces Inside Subdivision

Starting with the initial rectangular area, several test conditions are applied to determine whether the initial area should be subdivided into smaller rectangles or terminated and graphical information sent to the graphics processor for further processing. If the tests indicate that the view is sufficiently complex, the area is subdivided. Next, tests are applied to each of the smaller areas, subdividing these if the tests indicate that visibility of surfaces is still uncertain. The process continues until the subdivisions are easily analyzed, that is visibility of surfaces is certain or until they are reduced to a predetermined size, e.g. the size in the order of a single pixel. If the latter occurs, depth testing may be done on the subdivision to determine visible surfaces.

In order to determine the visible parts of surfaces inside a subdivision from the distribution of visible surfaces on its boundaries, the subdivision must satisfy certain test conditions. If the subdivision satisfies any one of these conditions, the subdivision is considered "simple" or "terminal" and visible surfaces are determined.

When a subdivision has not reduced to a predetermined minimum size, the following tests for surface visibility inside a subdivision are done.

The more complex tests for determining parts of surface visibility within a rectangular area can be stated in the following terms: no further subdivisions of a specified rectangular area are needed if one of the following conditions is true:

1. No projected visible surface boundary intersects with the boundary/perimeter of the subdivision and there are no opaque visible surfaces completely projected inside the subdivision.
2. No more than one opaque surface is visible along the entire perimeter of the subdivision and there are no opaque visible surfaces completely projected inside the subdivision.

Figure 10:
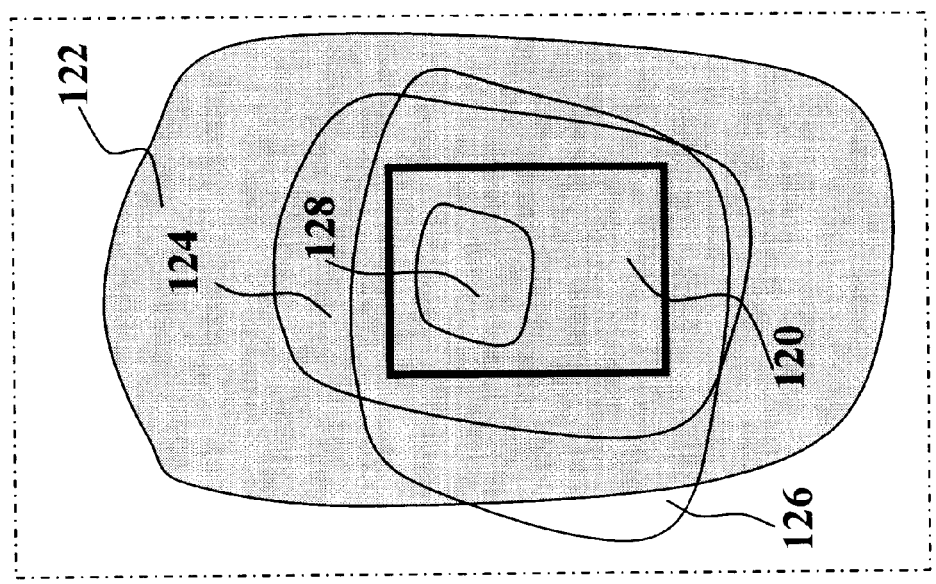
FIG. 10 illustrates certain conditions for determining visible parts of surfaces inside a subdivision in accordance with the teachings presented herein.

FIG. 10 illustrates an exemplary subdivision, which would satisfy Test 1. As is shown, view plane 100 comprises a subdivision 120 and surface projections 122, 124, 126 and 128 in accordance with this test condition. That is, projected surface 122 is opaque and projected surfaces 124, 126, 128 are transparent. Moreover, the boundaries of opaque surface projection 122 and 126 and transparent surface projections 124 does not intersect the subdivision 120 and surface projection 128 is transparent.

Here, parts of opaque surface projection 122 and transparent surfaces projections 124, 126 are visible. Transparent surface projection 128 located completed inside subdivision 120 is also visible Test 2

Figure 11:
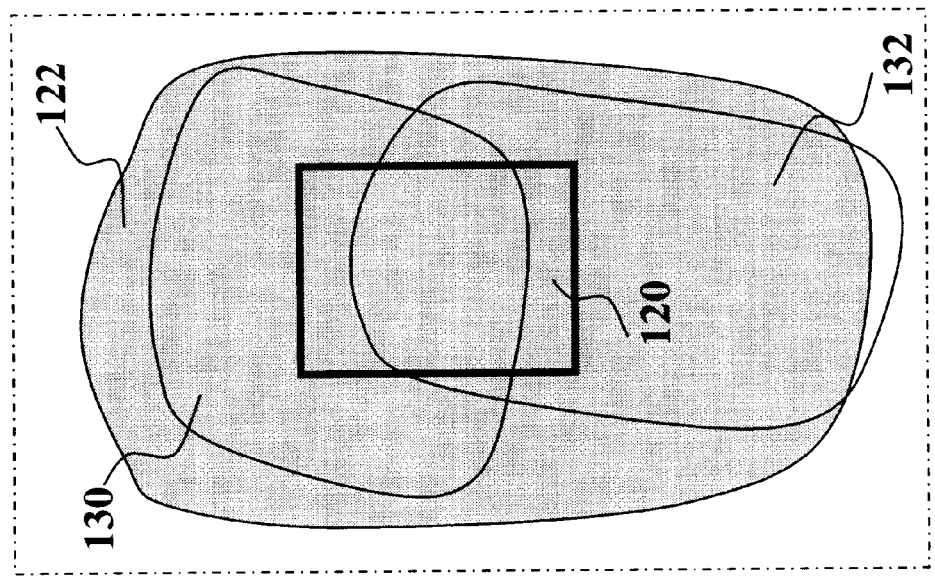
FIG. 11 illustrates certain other conditions for determining visible parts of surfaces inside subdivision in accordance with the teachings presented herein.

FIG. 11 illustrates an exemplary subdivision, which would satisfy Test 2. As is shown, view plane 100 comprises a subdivision 120 and surface projections 122, 130, and 132 in accordance with this test condition. That is, projected surface 122 is the only opaque surface and projected surfaces 130 and 132 are transparent. Projected surface 122 is visible along the entire perimeter of subdivision 120. Each transparent surface projection 130 and 132 is visible along at least a portion of the perimeter of the subdivision 120.

Here, portions of opaque surface projection 122 and transparent surfaces projections 130 and 132 are visible. If any of the above tests are true, the rectangular area or subdivision is simple enough or terminal; otherwise it will be subdivided into a collection of smaller subdivisions, and the tests will be repeated for each subdivisions.

The terminal conditions processed in block 334 and transferred to the respective branches according to whether or not certain criteria are satisfied.

If the size of a subdivision reduces to the minimal predefined size then control is transferred to block 336. Here, depth testing may be done to determine visible parts of surfaces. Otherwise, the process continues as follows: An opaque surface is determined, whose projection covers the subdivision. This opaque surface is visible along the perimeter of the subdivision.

In checking whether this case exists, the second elements of all arrays 270 of visible surfaces for all intersections of perimeter of processed subdivision are checked. In order to satisfy this case, the second elements of all arrays 270 of visible surfaces for all points of intersections along the perimeter of a subdivision, must contain the same element. This element corresponds to the opaque surface.

If the forgoing is true, then it follows that no more than one opaque surface is visible along the entire perimeter of the subdivision. Moreover, there may be several transparent surfaces which are also visible along the perimeter of the subdivision. The opaque surface is stored in field 320 of the current stack element. All determined visible transparent surfaces are collected and stored in field 318, preferably as an array of potentially visible surfaces in current stack element. Together 320 and 318 reference all potentially visible surfaces for the subdivision. Next, opaque surfaces having projections, which are located entirely inside the subdivision is determined using the array 240 of all minimal rectangles for surfaces.

If there are potentially visible surfaces control is transferred to block 338. If there are no such surfaces then control is transferred to block 336.

If there is no opaque surface whose projection covers the subdivision then field 320 of current stack element is set to empty and control is transferred to block 338.

In block 338 several steps are performed. First, all surfaces are determined, which are not obscured by the opaque surface whose projection covers the subdivision (i.e. the opaque surface stored in field 320 in current element of stack)—potentially visible surfaces. These potentially visible surfaces are taken from the array 240 of all minimal rectangles for surfaces and are added to an array of potentially visible surfaces (field 318 in current element of stack). Then the procedure for processing of division line ek is executed. It determines array 280 of intersections for division line ek and array 250 of all surfaces in point 1 in the middle of ek. These arrays are stored in the fields 312 and 314 of current stack element. The instruction to process right (top) subdivision is set (ehck in FIG. 25). Control is then transferred to block 332 for further processing.

In block 336 visible parts of surfaces inside subdivision are determined. Projected polygons, which are visible inside subdivision, form a part of these surfaces. Array 280 is used to to determine these polygons or surfaces. If size of processed subdivision does not exceed minimal predefined size then the polygons are determined from four arrays 280 for all sides of subdivision. Here, the following steps are done:

1. Determine all polygons, which make up the opaque surface whose projection covers the subdivision, that are visible along the perimeter of the subdivision.
2. Mark these polygons as visible.
3. All polygons which have common edges with the visible polygons 404 and are projected inside subdivision, are also marked as visible.

The procedure proceeds recursively for all other opaque surfaces projected inside the subdivision.

Figure 26:
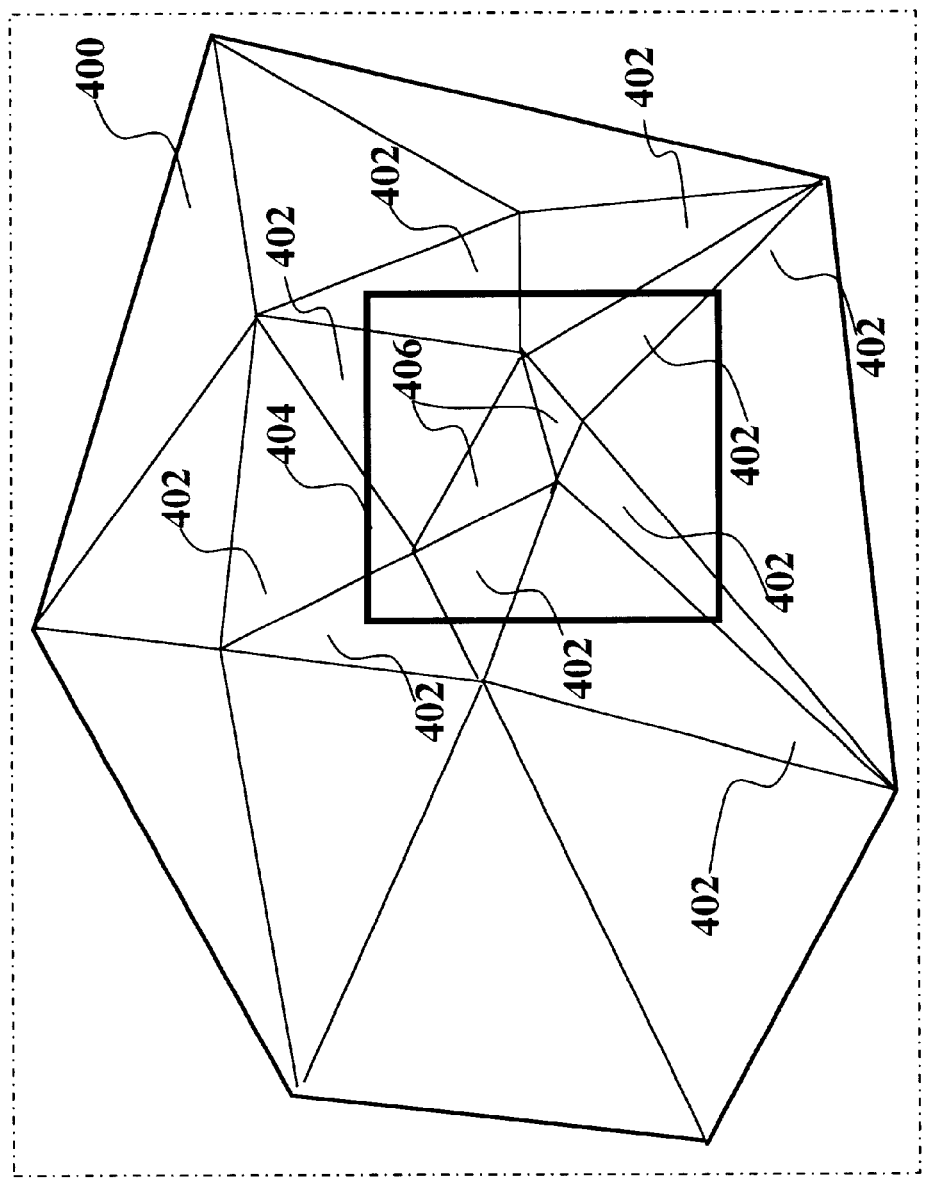
FIG. 26 illustrates a projection of a nontransparent surface on a view plane in accordance with the teachings presented herein.

To illustrate this point, reference is now made to FIG. 26, which demonstrates the projection 400 of the opaque surface, which is stored in field 320 of current stack element. Polygons 402, which are visible along the contour of processed subdivision 404, are determined. These polygons 402 are marked as visible. After that, all polygons 406, which have common edges with those visible polygons 404 and are projected inside subdivision, are also marked as visible. The procedure is proceeded recursively. This method is well known to those skillful in art.

All transparent surfaces, which are at least partially projected inside subdivision are determined from the constructed arrays 280 of points of intersections. Visible polygons of transparent surfaces inside subdivision are also determined by the same procedure, which was described herein above for opaque surfaces. Transparent surfaces, which are projected entirely inside the subdivision, are taken from array 240 of all rectangles for surfaces. The name of the subdivision is used for calculating index in this array. If transparent surfaces are not obscured by opaque surface, which was mentioned earlier, then all polygons of the transparent surfaces are marked as visible.

After all visible parts of surfaces projected inside a subdivision are determined, control is transferred to block 340. Block 340 checks for whether the conditions for process termination is satisfied. If the index of the current stack element is equal to zero then the process terminates. Otherwise, if field 316 of current stack element contains the name of right (top) subdivision then this element is deleted from stack, and the previous element in stack is set to current and the process repeats itself.

Finally, after visible surfaces have been determined, the vertices of all visible and partially visible polygons are fed through the graphics pipeline to be ultimately mapped to device coordinates (typically via one or more transformations) for further drawing on a display screen.

Having now described a preferred embodiment of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

Moreover, the techniques may be implemented in hardware or software, or a combination of the two. Preferably, the techniques are implemented in control programs executing on programmable devices that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program is preferably implemented in a high level procedural or object oriented programming language to communicate with a computer system, however, the programs can be implemented in assembly or machine language, if desired.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A method of determining the visibility of surfaces of three-dimensional objects, projected on a view plane from data defining said surfaces of three-dimensional objects, said method comprising:
   a) deriving data indicative of boundaries of projections of said surfaces on said view plane,
   b) determining a finite number of subdivisions of said view plane thereby providing perimeters of each of said subdivisions,
   c) determining points of intersection of said perimeter of one of said subdivisions with said boundaries of said surfaces projected on said view plane;
   d) determining the distribution of surfaces visible along said perimeter of said of one of said subdivisions by utilizing said points of intersection, and
   e) determining if said one subdivision is terminal from at least said distribution of surfaces visible along said perimeter of said one subdivision; wherein said step of determining if said one subdivision is terminal also considers if any of said projections of surfaces are wholly included in said one subdivision.

2. A method according to claim 1 wherein steps c) to e) are repeated on a second of said subdivisions.

3. A method according to claim 2 wherein it is determined that said one of said subdivisions is not terminal and said second of said subdivisions is part of said one of said subdivisions.

4. A method according to claim 2 wherein it is determined that said one of said subdivisions is not terminal and said second of said subdivisions is half of said one of said subdivisions.

5. A method of determining the visibility of surfaces of three-dimensional objects, projected on a view plane from data defining said surfaces of three-dimensional objects, said method comprising:
   a) deriving data indicative of boundaries of projections of said surfaces on said view plane,
   b) determining a finite number of subdivisions of said view plane thereby providing perimeters of each of said subdivisions, c) determining points of intersection of said perimeter of one of said subdivisions with said boundaries of said surfaces projected on said view plane;

d) determining the distribution of surfaces visible along said perimeter of said of one of said subdivisions by utilizing said points of intersection, and e) determining if said one subdivision is terminal from at least said distribution of surfaces visible along said perimeter of said one subdivision; wherein said step of determining if said one subdivision is terminal from at least said distribution of surfaces visible along said perimeter of said one subdivision considers whether there are 1) no points of intersection of said perimeter of said subdivision with said boundaries of visible surfaces projected on said view plane and 2) no opaque visible surfaces entirely projected inside said subdivision.

6. A method of determining the visibility of surfaces of three-dimensional objects, projected on a view plane from data defining said surfaces of three-dimensional objects, said method comprising:

a) deriving data indicative of boundaries of projections of said surfaces on said view plane, b) determining a finite number of subdivisions of said view plane thereby providing perimeters of each of said subdivisions, c) determining points of intersection of said perimeter of one of said subdivisions with said boundaries of said surfaces projected on said view plane;

d) determining the distribution of surfaces visible along said perimeter of said of one of said subdivisions by utilizing said points of intersection, and e) determining if said one subdivision is terminal from at least said distribution of surfaces visible along said perimeter of said one subdivision; wherein said step of determining if said one subdivision is terminal from at least said distribution of surfaces visible along said perimeter of said one subdivision considers whether there are 1) no more than one opaque surface visible along the entire perimeter of said one subdivision; and 2) no opaque visible surfaces entirely projected inside said one subdivision.

7. A method of determining the visibility of surfaces of three-dimensional objects, projected on a view plane from data defining said surfaces of three-dimensional objects, said method comprising:

a) deriving data indicative of boundaries of projections of said surfaces on said view plane, b) determining a finite number of subdivisions of said view plane thereby providing perimeters of each of said subdivisions, c) determining points of intersection of said perimeter of one of said subdivisions with said boundaries of said surfaces projected on said view plane;

d) determining the distribution of surfaces visible along said perimeter of said of one of said subdivisions by utilizing said points of intersection, and e) determining if said one subdivision is terminal from at least said distribution of surfaces visible along said perimeter of said one subdivision, wherein steps (c) and (e) is repeated until either said one subdivision is determined to be terminal or the size of said one subdivision reduces to a predetermined minimum size; and f) performing depth testing of said visible surfaces at least partially projected inside said one subdivision to determine said visible surfaces inside said subdivision, provided however, that said size of said one subdivision reduces to a predetermined minimum size.

8. A method of determining the visibility of surfaces of three-dimensional objects, projected on a view plane in data defining said surfaces of three-dimensional objects, said method comprising:

a) deriving data indicative of boundaries of projections of said surfaces on said view plane, b) determining a finite number of subdivisions of said view plane thereby providing perimeters of each of said subdivisions, c) determining points of intersection of said perimeter of one of said subdivisions with said boundaries of said surfaces projected on said view plane;

d) determining the distribution of surfaces visible along said perimeter of said of one of said subdivisions by utilizing said points of intersection, and e) determining if said one subdivision is terminal from at least said distribution of surfaces visible along said perimeter of said one subdivision; wherein said step of determining if said one subdivision is terminal from at least said distribution of surfaces visible along said perimeter of said one subdivision considers whether there are 1) no more than one opaque surface visible along the entire perimeter of said one subdivision; and 2) no opaque visible surfaces entirely projected inside said one subdivision; wherein said step of considering whether there no opaque visible surfaces entirely projected inside said one subdivision utilizes minimal rectangles for surfaces.

9. A system for determining the visibility of surfaces of three-dimensional objects, projected on a view plane from data defining said surfaces of three-dimensional objects, said system comprising:

a central processor programmed to:

a) derive data indicative of boundaries of projections of said surfaces on said view plane, b) determine a finite number of subdivisions of said view plane thereby providing perimeters of each of said subdivisions;

c) determine points of intersection of said perimeter of one of said subdivisions with said boundaries of said surfaces projected on said view plane;

d) determine the distribution of surfaces visible along said perimeter of said of one of said subdivisions by utilizing said points of intersection; and e) determine if said one subdivision is terminal from at least said distribution of surfaces visible along said perimeter of said one subdivision;

wherein said step of determining if said one subdivision is terminal also considers if any of said projections of surfaces are wholly included in said one subdivision.

10. A system according to claim 9 wherein c) to e) are repeated on a second of said subdivisions.

11. A system according to claim 10 wherein it is determined that said one of said subdivisions is not terminal and said second of said subdivisions is part of said one of said subdivisions.

12. A system according to claim 10 wherein it is determined that said one of said subdivisions is not terminal and said second of said subdivisions is half of said one of said subdivisions.

13. A system for determining the visibility of surfaces of three-dimensional objects, projected on a view plane from data defining said surfaces of three-dimensional objects, said system comprising:

a central processor programmed to:
  a) derive data indicative of boundaries of projections of said surfaces on said view plane,
  b) determine a finite number of subdivisions of said view plane thereby providing perimeters of each of said subdivisions;
  c) determine points of intersection of said perimeter of one of said subdivisions with said boundaries of said surfaces projected on said view plane;
  d) determine the distribution of surfaces visible along said perimeter of said of one of said subdivisions by utilizing said points of intersection; and
  e) determine if said one subdivision is terminal from at least said distribution of surfaces visible along said perimeter of said one subdivision;
  wherein said step of determining if said one subdivision is terminal from at least said distribution of surfaces visible along said perimeter of said one subdivision considers whether there are 1) no points of intersection of said perimeter of said subdivision with said boundaries of visible surfaces projected on said view plane and 2) no opaque visible surfaces entirely projected inside said subdivision.

14. A system for determining the visibility of surfaces of three-dimensional objects, projected on a view plane from data defining said surfaces of three-dimensional objects, said system comprising:
  a central processor programmed to:
    a) derive data indicative of boundaries of projections of said surfaces on said view plane,
    b) determine a finite number of subdivisions of said view plane thereby providing perimeters of each of said subdivisions;
    c) determine points of intersection of said perimeter of one of said subdivisions with said boundaries of said surfaces projected on said view plane;
    d) determine the distribution of surfaces visible along said perimeter of said of one of said subdivisions by utilizing said points of intersection; and
    e) determine if said one subdivision is terminal from at least said distribution of surfaces visible along said perimeter of said one subdivision;
    wherein said step of determining if said one subdivision is terminal from at least said distribution of surfaces visible along said perimeter of said one subdivision considers whether there are 1) no more than one opaque surface visible along the entire perimeter of said one subdivision; and 2) no opaque visible surfaces entirely projected inside said one subdivision.

15. A system for determining the visibility of surfaces of three-dimensional objects, projected on a view plane from data defining said surfaces of three-dimensional objects, said system comprising:
  a central processor programmed to:
    a) derive data indicative of boundaries of projections of said surfaces on said view plane,
    b) determine a finite number of subdivisions of said view plane thereby providing perimeters of each of said subdivisions;
    c) determine points of intersection of said perimeter of one of said subdivisions with said boundaries of said surfaces projected on said view plane;
    d) determine the distribution of surfaces visible along said perimeter of said of one of said subdivisions by utilizing said points of intersection; and
    e) determine if said one subdivision is terminal from at least said distribution of surfaces visible along said perimeter of said one subdivision wherein steps (c) and (e) is repeated until either said one subdivision is determined to be terminal or the size of said one subdivision reduces to a predetermined minimum size; and
    f) perform depth testing of said visible surfaces at least partially projected inside said one subdivision to determine said visible surfaces inside said subdivision, provided however, that said size of said one subdivision reduces to a predetermined minimum size.

16. A system for determining the visibility of surfaces of three-dimensional objects, projected on a view plane from data defining said surfaces of three-dimensional objects, said system comprising:
  a central processor programmed to:
    a) derive data indicative of boundaries of projections of said surfaces a said view plane,
    b) determine a finite number of subdivisions of said view plane thereby providing perimeters of each of said subdivisions;
    c) determine points of intersection of said perimeter of one of said subdivisions with said boundaries of said surfaces projected on said view plane;
    d) determine the distribution of surfaces visible along said perimeter of said of one of said subdivisions by utilizing said points of intersection; and
    e) determine if said one subdivision is terminal from at least said distribution of surfaces visible along said perimeter of said one subdivision;
    wherein said step of determining if said one subdivision is terminal from at least said distribution of surfaces visible along said perimeter of said one subdivision considers whether there are 1) no more than one opaque surface visible along the entire perimeter of said one subdivision; and 2) no opaque visible surfaces entirely projected inside said one subdivision;
    wherein said step of considering whether there no opaque visible surfaces entirely projected inside said one subdivision utilizes minimal rectangles for surfaces.

17. A system for determining the visibility of surfaces of three-dimensional objects, projected on a view plane from data defining said surfaces of three-dimensional objects, said system comprising:
  a central processor programmed to:
    a) derive data indicative of boundaries of projections of said surfaces said view plane,
    b) determine a finite number of subdivisions of said view plane thereby providing perimeters of each of said subdivisions;
    c) determine points of intersection of said perimeter of one of said subdivisions with said boundaries of said surfaces projected on said view plane;
    d) determine the distribution of surfaces visible along said perimeter of said of one of said subdivisions by utilizing said points of intersection; and
    e) determine if said one subdivision is terminal from at least said distribution of surfaces visible along said perimeter of said one subdivision;
    wherein said step of determining if said one subdivision is terminal from at least said distribution of surfaces visible along said perimeter of said one subdivision considers whether there are 1) no points of intersection of said perimeter of said subdivision with said boundaries of visible surfaces projected on said view plane and 2) no opaque visible surfaces entirely projected inside said subdivision;

wherein said step of considering whether there no opaque visible surfaces entirely projected inside said one subdivision utilizes minimal rectangles for surfaces.

18. A system for determining the visibility of surfaces of three-dimensional objects, projected on a view plane from data defining said surfaces of three-dimensional objects, said system comprising:
a central processor programmed to:
a) derive data indicative of boundaries of projections of said surfaces on said view plane,
b) determine a finite number of subdivisions of said view plane thereby providing perimeters of each of said subdivisions;
c) determine points of intersection of said perimeter of one of said subdivisions with said boundaries of said surfaces projected on said view plane;
d) determine the distribution of surfaces visible along said perimeter of said of one of said subdivisions by utilizing said points of intersection;
e) determine if said one subdivision is terminal from at least said distribution of surfaces visible along said perimeter of said one subdivision;
wherein said step of determining points of intersection of said perimeter of one of said subdivisions with said boundaries also considers whether there are any potentially visible surfaces associated with said one subdivision.

19. A system for determining the visibility of surfaces of three-dimensional objects, projected on a view plane from data defining said surfaces of three-dimensional objects, said system comprising:
a central processor programmed to:
a) derive data indicative of boundaries of projections of said surfaces on said view plane,
b) determine a finite number of subdivisions of said view plane thereby providing perimeters of each of said subdivisions;
c) determine points of intersection of said perimeter of one of said subdivisions with said boundaries of said surfaces projected on said view plane;
d) determine the distribution of surfaces visible along said perimeter of said of one of said subdivisions by utilizing said points of intersection;
e) determine if said one subdivision is terminal from at least said distribution of surfaces visible along said perimeter of said one subdivision;
wherein said step of determining points of intersection of said perimeter of one of said subdivisions with said boundaries utilizes minimal rectangles for projected surface boundary edges.

20. A computer-readable medium having computer-executable instructions for performing a method comprising:
a) deriving data indicative of boundaries of projections of said surfaces on said view plane;
b) determining a finite number of subdivisions of said view plane thereby providing perimeters of each of said subdivisions;
c) determining points of intersection of said perimeter of one of said subdivisions with said boundaries of said surfaces projected on said view plane;
d) determining the distribution of surfaces visible along said perimeter of said of one of said subdivisions by utilizing said points of intersection;
e) determining if said one subdivision is terminal from at least said distribution of surfaces visible along said perimeter of said one subdivision;
wherein said step of determining if said one subdivision is terminal also considers if any of said projections of surfaces are wholly included in said one subdivision.

21. A computer-readable medium according to claim 20 wherein steps c) to e) are repeated on a second of said subdivisions.

22. A computer-readable medium according to claim 21 wherein it is determined that said one of said subdivisions is not terminal and said second of said subdivisions is part of said one of said subdivisions.

23. A computer-readable medium according to claim 21 wherein it is determined that said one of said subdivisions is not terminal and said second of said subdivisions is half of said one of said subdivisions.

24. A computer-readable medium having computer-executable instructions for performing a method comprising:
a) deriving data indicative of boundaries of projections of said surfaces on said view plane;
b) determining a finite number of subdivisions of said view plane thereby providing perimeters of each of said subdivisions;
c) determining points of intersection of said perimeter of one of said subdivisions with said boundaries of said surfaces projected on said view plane;
d) determining the distribution of surfaces visible along said perimeter of said of one of said subdivisions by utilizing said points of intersection;
e) determining if said one subdivision is terminal from at least said distribution of surfaces visible along said perimeter of said one subdivision;
wherein said step of determining if said one subdivision is terminal from at least said distribution of surfaces visible along said perimeter of said one subdivision considers whether there are 1) no points of intersection of said perimeter of said subdivision with said boundaries of visible surfaces projected on said view plane and 2) no opaque visible surfaces entirely projected inside said subdivision.

25. A computer-readable medium according to claim 24 wherein said step of considering whether there no opaque visible surfaces entirely projected inside said one subdivision utilizes minimal rectangles for surfaces.

26. A computer-readable medium having computer-executable instructions for performing a method comprising:
a) deriving data indicative of boundaries of projections of said surfaces on said view plane;
b) determining a finite number of subdivisions of said view plane thereby providing perimeters of each of said subdivisions;
c) determining points of intersection of said perimeter of one of said subdivisions with said boundaries of said surfaces projected on said view plane;
d) determining the distribution of surfaces visible along said perimeter of said of one of said subdivisions by utilizing said points of intersection;
e) determining if said one subdivision is terminal from at least said distribution of surfaces visible along said perimeter of said one subdivision;
wherein said step of determining if said one subdivision is terminal from at least said distribution of surfaces visible along said perimeter of said one subdivision considers whether there are 1) no more than one opaque surface visible along the entire perimeter of said one subdivision; and 2) no opaque visible surfaces entirely projected inside said one subdivision.

27. A computer-readable medium according to claim 26 wherein said step of considering whether there no opaque visible surfaces entirely projected inside said one subdivision utilizes minimal rectangles for surfaces.

28. A computer-readable medium having computer-executable instructions for performing a method comprising:
   a) deriving data indicative of boundaries of projections of said surfaces on said view plane;
   b) determining a finite number of subdivisions of said view plane thereby providing perimeters of each of said subdivisions;
   c) determining points of intersection of said perimeter of one of said subdivisions with said boundaries of said surfaces projected on said view plane;
   d) determining the distribution of surfaces visible along said perimeter of said of one of said subdivisions by utilizing said points of intersection;
   e) determining if said one subdivision is terminal from at least said distribution of surfaces visible along said perimeter of said one subdivision; wherein steps (c) and (e) is repeated until either said one subdivision is determined to be terminal or the size of said one subdivision reduces to a predetermined minimum size;
   performing depth testing of said visible surfaces at least partially projected inside said one subdivision to determine said visible surfaces inside said subdivision, provide however, that said size of said one subdivision reduces to a predetermined minimum size.

29. A computer-readable medium having computer-executable instructions for performing a method comprising:
   a) deriving data indicative of boundaries of projections of said surfaces on said view plane;
   b) determining finite number of subdivisions of said view plane thereby providing perimeters of each of said subdivisions;
   c) determining points of intersection of said perimeter of one of said subdivisions with said boundaries of said surfaces projected on said view plane;
   d) determining the distribution of surfaces visible along said perimeter of said of one of said subdivisions by utilizing said points of intersection;
   e) determining if said one subdivision is terminal from at least said distribution of surfaces visible along said perimeter of said one subdivision;
   wherein said step of determining points of intersection of said perimeter of one of said subdivisions with said boundaries also considers whether there are any potentially visible surfaces associated with said one subdivision.

30. A computer-readable medium having computer-executable instructions for performing a method comprising:
   a) deriving data indicative of boundaries of projections of said surfaces on said view plane;
   b) determining a finite number of subdivisions of said view plane thereby providing perimeters of each of said subdivisions;
   c) determining points of intersection of said perimeter of one of said subdivisions with said boundaries of said surfaces projected on said view plane;
   d) determining the distribution of surfaces visible along said perimeter of said of one of said subdivisions by utilizing said points of intersection;
   e) determining if said one subdivision is terminal from at least said distribution of surfaces visible along said perimeter of said one subdivision;
   wherein said step of determining points of intersection of said perimeter of one of said subdivisions with said boundaries utilizes minimal rectangles for projected surface boundary edges.

* * * * *